United States Patent
Maguire

(10) Patent No.: US 8,514,658 B2
(45) Date of Patent: Aug. 20, 2013

(54) DOWNSCAN IMAGING SONAR FOR REDUCED INTERFERENCE

(75) Inventor: Brian T. Maguire, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 0 days.

(21) Appl. No.: 13/301,957

(22) Filed: Nov. 22, 2011

(65) Prior Publication Data

US 2012/0106300 A1 May 3, 2012

Related U.S. Application Data

(63) Continuation of application No. 12/460,139, filed on Jul. 14, 2009, now Pat. No. 8,305,840.

(51) Int. Cl.
*G01S 15/00* (2006.01)
*G01S 15/89* (2006.01)

(52) U.S. Cl.
CPC ................................ *G01S 15/89* (2013.01)
USPC .......................................................... 367/88

(58) Field of Classification Search
USPC .......................................................... 367/88
See application file for complete search history.

(56) References Cited

U.S. PATENT DOCUMENTS

| | | | |
|---|---|---|---|
| 1,823,329 A | 9/1931 | Marrison | |
| 2,416,338 A | 2/1947 | Mason | |
| 3,005,973 A | 10/1961 | Kietz | |
| 3,090,030 A | 5/1963 | Schuck | |
| 3,142,032 A | 7/1964 | Jones | |
| 3,144,631 A | 8/1964 | Lustig et al. | |
| 3,296,579 A | 1/1967 | Farr et al. | |
| 3,359,537 A | 12/1967 | Geil et al. | |

(Continued)

FOREIGN PATENT DOCUMENTS

| DE | 1 566 870 A1 | 4/1970 |
|---|---|---|
| DE | 35 16 698 A1 | 11/1986 |

(Continued)

OTHER PUBLICATIONS

Ballantyne, J.; "Find and Catch More Fish, Quickly and Easily, with the Fishin' Buddy 2255"; [Online]; [Retrieved on Dec. 7, 2011]; Retrieved from the Internet <URL:http://www.articleslash.net/Recreation-and-Sports/Fishing/67018_Find-and-Catch-More-Fish-Quickly-and-Easily-with-the-FISHIN-BUDDY-2255.html>; 4 pages.

(Continued)

*Primary Examiner* — Isam Alsomiri
*Assistant Examiner* — James Hulka
(74) *Attorney, Agent, or Firm* — Alston & Bird LLP

(57) ABSTRACT

A sonar transducer assembly for mounting to a surface watercraft includes a rectangular first transducer configured to produce a first beam defining a fan-shape and extending generally in a first plane. The assembly further includes a rectangular second transducer configured to produce a second beam defining a fan-shape and extending generally in a second plane. The first transducer and the second transducer are oriented such that the respective first and second beams insonify different first and second areas each extending laterally with respect to a running direction of the surface watercraft, and such that the first beam is outside of the second plane of the second beam, the resulting planar separation of the first and second planes of the first and second beams reducing interference between the first and second transducers.

21 Claims, 23 Drawing Sheets

(56) References Cited

U.S. PATENT DOCUMENTS

| | | | |
|---|---|---|---|
| 3,381,264 A | 4/1968 | Lavergne et al. |
| 3,451,038 A | 6/1969 | Maass |
| 3,458,854 A | 7/1969 | Murphree |
| 3,484,737 A | 12/1969 | Walsh |
| 3,496,524 A | 2/1970 | Stavis et al. |
| 3,553,638 A | 1/1971 | Sublett |
| 3,585,578 A | 6/1971 | Fischer, Jr. et al. |
| 3,585,579 A | 6/1971 | Dorr et al. |
| 3,618,006 A | 11/1971 | Wright |
| 3,624,596 A | 11/1971 | Dickenson et al. |
| 3,716,824 A | 2/1973 | Dorr et al. |
| 3,742,436 A | 6/1973 | Jones |
| 3,757,287 A | 9/1973 | Bealor, Jr. |
| 3,781,775 A | 12/1973 | Malloy et al. |
| 3,895,339 A | 7/1975 | Jones et al. |
| 3,895,340 A | 7/1975 | Gilmour |
| 3,898,608 A | 8/1975 | Jones et al. |
| 3,907,239 A | 9/1975 | Ehrlich |
| 3,922,631 A | 11/1975 | Thompson et al. |
| 3,949,348 A | 4/1976 | Dorr |
| 3,950,723 A | 4/1976 | Gilmour |
| 3,953,828 A | 4/1976 | Cook |
| 3,964,424 A | 6/1976 | Hagemann |
| 3,967,234 A | 6/1976 | Jones |
| 3,975,704 A | 8/1976 | Klein |
| 4,030,096 A | 6/1977 | Stevens et al. |
| 4,047,148 A | 9/1977 | Hagemann |
| 4,052,693 A | 10/1977 | Gilmour |
| 4,063,212 A | 12/1977 | Sublett |
| 4,068,209 A | 1/1978 | Lagier |
| 4,075,599 A | 2/1978 | Kosalos et al. |
| 4,121,190 A | 10/1978 | Edgerton et al. |
| 4,184,210 A | 1/1980 | Hageman |
| 4,197,591 A | 4/1980 | Hagemann |
| 4,198,702 A | 4/1980 | Clifford |
| 4,199,746 A | 4/1980 | Jones et al. |
| 4,200,922 A | 4/1980 | Hagemann |
| 4,204,281 A | 5/1980 | Hagemann |
| 4,207,620 A | 6/1980 | Morgera |
| 4,216,537 A | 8/1980 | Delignieres |
| 4,232,380 A | 11/1980 | Caron et al. |
| 4,247,923 A | 1/1981 | De Kok |
| 4,262,344 A | 4/1981 | Gilmour |
| 4,287,578 A | 9/1981 | Heyser |
| RE31,026 E * | 9/1982 | Shatto ............... 367/106 |
| 4,400,803 A | 8/1983 | Spiess et al. |
| 4,413,331 A | 11/1983 | Rowe, Jr. et al. |
| 4,422,166 A | 12/1983 | Klein |
| 4,456,210 A | 6/1984 | McBride |
| 4,493,064 A | 1/1985 | Odero et al. |
| 4,538,249 A | 8/1985 | Richard |
| 4,561,076 A | 12/1985 | Gritsch |
| 4,596,007 A | 6/1986 | Grall et al. |
| 4,635,240 A | 1/1987 | Geohegan, Jr. et al. |
| 4,641,290 A | 2/1987 | Massa et al. |
| 4,642,801 A | 2/1987 | Perny |
| 4,751,645 A | 6/1988 | Abrams et al. |
| 4,774,837 A | 10/1988 | Bird |
| 4,796,238 A | 1/1989 | Bourgeois et al. |
| 4,802,148 A | 1/1989 | Gilmour |
| 4,815,045 A | 3/1989 | Nakamura |
| 4,855,961 A | 8/1989 | Jaffe et al. |
| 4,879,697 A | 11/1989 | Lowrance et al. |
| 4,907,208 A | 3/1990 | Lowrance et al. |
| 4,912,685 A | 3/1990 | Gilmour |
| 4,924,448 A | 5/1990 | Gaer |
| 4,935,906 A | 6/1990 | Baker et al. |
| 4,939,700 A | 7/1990 | Breton |
| 4,958,330 A | 9/1990 | Higgins |
| 4,970,700 A * | 11/1990 | Gilmour et al. ............ 367/88 |
| 4,972,387 A | 11/1990 | Warner |
| 4,975,887 A | 12/1990 | Maccabee et al. |
| 4,982,924 A | 1/1991 | Havins |
| 5,033,029 A | 7/1991 | Jones |
| 5,077,699 A | 12/1991 | Passamante et al. |
| 5,109,364 A | 4/1992 | Stiner |
| 5,113,377 A | 5/1992 | Johnson |
| 5,142,497 A | 8/1992 | Warrow |
| 5,142,502 A | 8/1992 | Wilcox et al. |
| D329,615 S | 9/1992 | Stiner |
| D329,616 S | 9/1992 | Stiner |
| 5,155,706 A | 10/1992 | Haley et al. |
| 5,182,732 A | 1/1993 | Pichowkin |
| 5,184,330 A | 2/1993 | Adams et al. |
| 5,200,931 A | 4/1993 | Kosalos et al. |
| 5,214,744 A | 5/1993 | Schweizer et al. |
| 5,231,609 A | 7/1993 | Gaer |
| 5,237,541 A | 8/1993 | Woodsum |
| 5,241,314 A | 8/1993 | Keeler et al. |
| 5,243,567 A | 9/1993 | Gingerich |
| 5,245,587 A | 9/1993 | Hutson |
| 5,257,241 A | 10/1993 | Henderson et al. |
| 5,260,912 A | 11/1993 | Latham |
| 5,297,109 A * | 3/1994 | Barksdale et al. ............ 367/106 |
| 5,299,173 A | 3/1994 | Ingram |
| 5,303,208 A | 4/1994 | Dorr |
| 5,376,933 A | 12/1994 | Tupper et al. |
| 5,390,152 A | 2/1995 | Boucher et al. |
| 5,412,618 A | 5/1995 | Gilmour |
| 5,433,202 A | 7/1995 | Mitchell et al. |
| 5,438,552 A | 8/1995 | Audi et al. |
| 5,442,358 A | 8/1995 | Keeler et al. |
| 5,455,806 A | 10/1995 | Hutson |
| 5,485,432 A | 1/1996 | Aechter et al. |
| 5,493,619 A | 2/1996 | Haley et al. |
| 5,515,337 A | 5/1996 | Gilmour et al. |
| 5,525,081 A * | 6/1996 | Mardesich et al. ............ 440/6 |
| 5,537,366 A | 7/1996 | Gilmour |
| 5,537,380 A | 7/1996 | Sprankle, Jr. et al. |
| 5,546,356 A | 8/1996 | Zehner |
| 5,546,362 A | 8/1996 | Baumann et al. |
| 5,561,641 A | 10/1996 | Nishimori et al. |
| 5,574,700 A | 11/1996 | Chapman |
| 5,596,549 A | 1/1997 | Sheriff |
| 5,602,801 A | 2/1997 | Nussbaum et al. |
| 5,612,928 A | 3/1997 | Haley et al. |
| 5,623,524 A | 4/1997 | Weiss et al. |
| 5,675,552 A | 10/1997 | Hicks et al. |
| 5,694,372 A | 12/1997 | Perennes |
| 5,790,474 A | 8/1998 | Feintuch |
| 5,805,525 A | 9/1998 | Sabol et al. |
| 5,805,528 A | 9/1998 | Hamada et al. |
| 5,808,967 A | 9/1998 | Yu et al. |
| 5,850,372 A | 12/1998 | Blue |
| 5,930,199 A | 7/1999 | Wilk |
| 5,991,239 A | 11/1999 | Fatemi-Booshehri et al. |
| 6,002,644 A | 12/1999 | Wilk |
| 6,084,827 A | 7/2000 | Johnson et al. |
| 6,130,641 A | 10/2000 | Kraeutner et al. |
| 6,215,730 B1 | 4/2001 | Pinto |
| 6,226,227 B1 | 5/2001 | Lent et al. |
| 6,273,771 B1 * | 8/2001 | Buckley et al. ............... 440/84 |
| 6,285,628 B1 | 9/2001 | Kiesel |
| 6,325,020 B1 | 12/2001 | Guigne et al. |
| 6,335,905 B1 | 1/2002 | Kabel |
| 6,421,299 B1 | 7/2002 | Betts et al. |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,778,468 B1 | 8/2004 | Nishimori et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,035,166 B2 | 4/2006 | Zimmerman et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,355,924 B2 | 4/2008 | Zimmerman et al. |
| 7,369,459 B2 | 5/2008 | Kawabata et al. |

| | | | |
|---|---|---|---|
| 7,405,999 B2 | 7/2008 | Skjold-Larsen | |
| 7,542,376 B1 | 6/2009 | Thompson et al. | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,839,720 B2 | 11/2010 | Brumley et al. | |
| 7,889,600 B2 | 2/2011 | Thompson et al. | |
| 7,961,552 B2 | 6/2011 | Boucher et al. | |
| 8,300,499 B2 | 10/2012 | Coleman et al. | |
| 8,305,841 B2 | 11/2012 | Riordan et al. | |
| 2001/0026499 A1 | 10/2001 | Inouchi | |
| 2002/0071029 A1 | 6/2002 | Zell et al. | |
| 2002/0085452 A1 | 7/2002 | Scanlon | |
| 2002/0126577 A1 | 9/2002 | Borchardt | |
| 2003/0202426 A1 | 10/2003 | Ishihara et al. | |
| 2003/0206489 A1 | 11/2003 | Preston et al. | |
| 2003/0214880 A1 | 11/2003 | Rowe | |
| 2004/0184351 A1 | 9/2004 | Nishimori et al. | |
| 2004/0221468 A1 | 11/2004 | Cotterchio et al. | |
| 2005/0036404 A1 | 2/2005 | Zhu et al. | |
| 2005/0043619 A1 | 2/2005 | Sumanaweera et al. | |
| 2005/0099887 A1 | 5/2005 | Zimmerman et al. | |
| 2005/0216487 A1 | 9/2005 | Fisher et al. | |
| 2006/0002232 A1 | 1/2006 | Shah et al. | |
| 2006/0023570 A1 | 2/2006 | Betts et al. | |
| 2007/0025183 A1 | 2/2007 | Zimmerman et al. | |
| 2007/0091723 A1 | 4/2007 | Zhu et al. | |
| 2007/0159922 A1 | 7/2007 | Zimmerman et al. | |
| 2008/0013404 A1 | 1/2008 | Acker et al. | |
| 2008/0137483 A1 | 6/2008 | Sawrie | |
| 2009/0031940 A1 | 2/2009 | Stone et al. | |
| 2010/0157736 A1* | 6/2010 | Riordan et al. | 367/88 |
| 2011/0007606 A1 | 1/2011 | Curtis | |
| 2011/0012773 A1 | 1/2011 | Cunning et al. | |
| 2011/0013484 A1 | 1/2011 | Coleman et al. | |
| 2011/0013485 A1 | 1/2011 | Maguire | |

FOREIGN PATENT DOCUMENTS

| | | |
|---|---|---|
| EP | 1 272 870 B1 | 4/2004 |
| EP | 1 393 025 B1 | 2/2006 |
| EP | 2 023 159 A1 | 2/2009 |
| GB | 823304 A | 11/1959 |
| GB | 1 306 769 A | 2/1973 |
| GB | 1 315 651 A | 5/1973 |
| GB | 1316138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| JP | 50-109389 (U) | 9/1975 |
| JP | 54-054365 (U) | 4/1979 |
| JP | 57-046173 (A) | 3/1982 |
| JP | S-59-107285 A | 9/1984 |
| JP | S-61-102574 A | 5/1986 |
| JP | 61-116678 (A) | 6/1986 |
| JP | S-61-262674 A | 11/1986 |
| JP | 62-099877 (U) | 6/1987 |
| JP | 62-134084 (A) | 8/1987 |
| JP | 62-190480 (A) | 8/1987 |
| JP | 63-261181 (A) | 10/1988 |
| JP | H-03-85476 A | 4/1991 |
| JP | 4-357487 A | 12/1992 |
| JP | 4357487 (A) | 12/1992 |
| JP | 7-031042 (A) | 1/1995 |
| JP | H-10-123247 A | 5/1998 |
| JP | H-10-132930 A | 5/1998 |
| JP | 10-186030 (A) | 7/1998 |
| JP | H-10-325871 A | 12/1998 |
| JP | 2001-074840 (A) | 3/2001 |
| JP | 2004-020276 (A) | 1/2004 |
| JP | 2006-064524 A | 3/2006 |
| WO | WO 84/01833 A1 | 5/1984 |
| WO | WO-91/02989 A1 | 3/1991 |
| WO | WO 98/15846 | 4/1998 |
| WO | WO 03/009276 A2 | 1/2003 |
| WO | WO-2005/057234 A1 | 6/2005 |
| WO | WO-2008/105932 A2 | 9/2008 |
| WO | WO2008/152618 * | 12/2008 |
| WO | WO-2008/152618 A1 | 12/2008 |
| WO | WO 2011/008429 A1 | 1/2011 |

OTHER PUBLICATIONS

Deep Vision Side Scan Sonar Systems; [Online]; [Retrieved on Dec. 2, 2011]; Retrieved from the Internet <URL:http://www.deepvision. se/products.htm>; 5 pages.

Fishin' Buddy 4200™ Operations Manual; Dated Dec. 21, 2005; 16 pages.

Fishing Tool Reviews—Bottom Line Fishin Buddy 1200 Fishfmder; [Online]; [Retrieved on Dec. 7, 2011]; Retrieved from the Internet <URL:http://www.tackletour.com/reviewbottomline1200.html>; 4 pages.

Humminbird 100 Series™ Fishin' Buddy®; 110, 120, 130 and 140c Product Manual; © 2007; 2 pages.

Sidefinder—Reviews & Brand Information—Techsonic Industries, Inc.; [Online]; [Retrieved on Dec. 7, 2011]; Retrieved from the Internet <URL: http://www.trademarkia.com/sidefinder-74113182. html>; 3 pages.

Trademark Electronic Search System (TESS); Word Mark: Sidefinder; [Online]; [Retrieved on Dec. 7, 2011]; Retrieved from the Internet <URL:http://tess2.uspto.gov/bin/showfield?f= doc&state=4009:qi4jkj.2.1>; 2 pages.

Marine Acoustics Society of Japan (Editor); "Basics and Application of Marine Acoustics"; Apr. 28, 2004; pp. 152-172.

Anderson, K.; "Side-Scanning for Sport Fishing"; Salt Water Sportsman; Apr. 1, 2009; 4 pages.

Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.

Armstrong, A.A., et al.; "New Technology for Shallow Water Hydrographic Surveys"; Proceedings of the $25^{th}$ Joint Meeting of UJNR Sea-bottom Surveys Panel; Dec. 1996.

Asplin, R.G., et al.; "A new Generation Side Scan Sonar"; OCEANS '88 Proceedings. 'A Partnership of Marine Interests'; vol. 2; Oct.-Nov. 1988; pp. 329-334.

Carey, W.M., "Sonar Array Characterization, Experimental Results"; IEEE Journal of Oceanic Engineering ; vol. 23; Issue 3; Jul. 1998; pp. 297-306.

Baker, N., et al, "Rifting History of the Northern Mariana Trough: SeaMARCH II and Seismic Reflection Surveys," Journals of Geophysical Research, vol. 101, No. B5, May 10, 1996.

Cowie, P.A., et al., "Quantitative Fault Studies on the East Pacific Rise: A Comparison of Sonar Imaging Techniques," Journal of Geophysical Research, vol. 99, B8, Aug. 10, 1994.

Curcio, J., et al.; "SCOUT—A Low Cost Autonomous Surface Platform for Research in Cooperative Autonomy"; Department of Mechanical Engineering; Massachusetts Institute of Technology; Aug. 2005.

Farrell, E.J.; , "Color Display and Interactive Interpretation of Three-Dimensional Data"; IBM Journal of Research and Development; vol. 27; No. 4; Jul. 1983; pp. 356-366.

Glynn, Jr., J.M., et al.; "Survey Operations and Results Using a Klein 5410 Bathymetric Sidescan Sonar"; Retrieved from the Internet <URL: http://www.thsoa.org/hy07/03_04.pdf; Mar. 2007.

Hansen, H.H.; "Circular vs. rectangular transducers"; Department of Electronics and Telecommunications; Norwegian University of Science and Technolgy; Mar. 2010; 28 pages.

Hughes Clarke, J. E., et al.; Knudsen 320 200 kHz keel-mounted sidescan trials; Results from 2000/2001/2002 field operations; [online]; Retrieved on Jun. 23, 2010 from the Internet <URL: http://www.omg.unb.ca/Ksidescan/K320_SStrials.html; 11 pages.

Hughes Clarke, J.E.; "Seafloor characterization using keel-mounted sidescan: proper compensation for radiometric and geometric distortion"; Canadian Hydrographic Conference; May 2004; 18 pages.

Hussong, D.M., et al., "High-Resolution Acoustic Seafloor Mapping," $20^{th}$ Annual OTC, Houston, TX, May 2-5, 1988.

Jonsson, J., et al. "Simulation and Evaluation of Small High-Frequency Side-Scan Sonars using COMSOL"; Excerpt from the Proceedings of the COMSOL Conference; 2009; Milan, Italy.

Key, W.H.; "Side Scan Sonar Technology"; Oceans 2000 MTS/IEEE Conference and Exhibition; vol. 2; Sep. 2000; pp. 1029-1033.

Kielczynski, P., et al.; "Finite Element Method (FEM) and Impulse Response Method (IRM) analysis of circular and rectangular transducers"; 1995 IEEE Ultrasonics Symposium; 1995; pp. 693-696.

Kozak, G.; "Side Scan Sonar Target Comparative Techniques for Port Security and MCM Q-Route Requirements"; L-3 Communications; Klein Associates, Inc.; [Online]; Retrieved from the Internet <URL: http://www.chesapeaketech.com/techniques-port-security.pdf; 11 pages.

Krotser, D.J., et al.; "Side-Scan Sonar: Selective Textural Enhancement"; Oceans'76; Washington, DC; Sep. 1976.

Kvitek, R.G., et al.; "Victoria Land Latitudinal Gradient Project: Benthic Marine Habitat Characterization"; California State University; Monterey Bay; Field Report; Feb. 25, 2004.

Langeraar, W.; "Surveying and Charting of the Seas"; Elsevier Oceanography Series; vol. 37; Sep. 1983; p. 321.

Manley, J.E.; "Development of the Autonomous Surface Craft 'Aces'"; Oceans '97 MTS/IEEE Conference Proceedings; Oct. 1997; pp. 827-832.

Manley, J.E., et al.; "Evolution of the Autonomous Surface Craft 'AutoCar'"; Oceans 2000 MTS/IEEE Conference and Exhibition; vol. 1; Sep. 2000; pp. 403-408.

Melvin, G., et al.; Commercial fishing vessels, automatic acoustic logging systems and 3D data visualization; ICES; Journal of Marine Science; vol. 59; Issue 1; 2002; pp. 179-189.

Newman, P.M.; "MOOS-Mission Orientated Operating Suite"; Department of Ocean Engineering; Massachusetts Institute of Technology; 2002.

Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.

Prickett, T.; "Underwater Inspection of Coastal Structures"; The REMR Bulletin; vol. 14; No. 2; Aug. 1997.

Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.

Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.

Shono, K., et al.; "Integrated Hydro-Acoustic Survey Scheme for Mapping of Sea Bottom Ecology"; Ocean Research Institute; Tokyo, Japan; Nov. 2004.

Trevorrow, M.V., et al.; "Description and Evaluation of a Four-Channel, Coherent 100-kHz Sidescan Sonar"; Defence R&D Canada-Atlantic; Dec. 2004.

Vaganay, J., et al.; "Experimental validation of the Moving Long Base-Line Navigation Concept"; 2004 IEEE/OES Autonomous Underwater Vehicles; Jun. 2004.

Vaneck, T.W., et al.; "Automated Bathymetry Using an Autonomous Surface Craft"; Journal of the Institute of Navigation; vol. 43; Issue 4; Winter 1996; pp. 329-334.

Waite, A.D.; "Sonar for Practising Engineers"; Third Edition; John Wiley & Sons, Ltd.; West Sussex, England; © 2002; 323 pages.

Alpine Geophysical Data Programmer Model 485C Brochure and letter dated Feb. 17, 1976; 2 pages.

Benthos C3D Sonar Imaging System; "High Resolution Side Scan Imagery with Bathymetry"; Benthos, Inc.; © May 2002.

Coastal Engineering Technical Note; "Side-Scan Sonar for Inspecting Coastal Structures"; U.S. Army Engineer Waterways Experiment Station; Revised Nov. 1983.

ConCAT Containerised Catamaran; Inshore hydrographic survey vessel that fits in a container; In Cooperation with Uniteam International; Kongsberg Simrad AS; Apr. 2004.

Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.

Detailed Sonar Transducer Product Information; Transducer Products; Side Scans; Models T36, T63, T62, and T403; Dec. 30, 2003; Retrieved from Internet: URL:http://www.neptune-sonar.com/products.as_btype=Side-Scan+Transducers&category=; 4 pages.

Kongsberg Brochure EA 400 Survey; "A complete, integrated survey system"; Kongsberg Maritime AS; Oct. 2003.

Kongsberg Brochure EA 400/600 "Sidescan Echo sounder with combined sidescan and depth soundings"; Kongsberg Maritime AS; May 2004.

EDO Corporation Global Technology Reach, Model 6400 Fan Beam Transducer; http:/web/archive/org/web/20040608054923/www.edoceramic.con/NavDucers.htm; Jun. 3, 2004.

EM1110-2-1003; Department of the Army; U.S. Army Corps of Engineers; Engineering and Design; Hydrographic Surveying; Apr. 1, 2004.

U.S. Appl. No. 60/552,769, filed Mar. 12, 2004; Applicant: Terrence Schoreder.

Final Report; Early Implementation of Nearshore Ecosystem Database Project Tasks 2 and 3; [online]; Retrieved on Feb. 26, 2010 from the Internet <URL: http://seafloor.csumb.edu/taskforce/html%202%20web/fmalreport.htm; 90 pages.

FishFinder L265 Instruction Manual; Raymarine; 79 pages.

FishFinder L365 Instruction Manual; Raymarine; 83 pages.

FishFinder L470 Instruction Manual; Raymarine; 102 pages.

FishFinder L750 Instruction Manual; Raymarine; 93 pages.

GeoAcoustics; A Kongsberg Company; GeoSwath Plus Brochure; "Wide swath bathymetry and georeferenced side scan"; [Online]; Retrieved from the internet < URL: http://www.km.kongsberg.com/ks/web/nokbg0397.nsf/AllWeb/F4B7FD3461368388C1257599002D34BC/$file/GeoSwath-Plus-brochure.pdf?OpenElement;.

GeoPulse; GeoAcoustics Pinger Sub-Bottom Profiler; Retrieved from the Internet <URL: http://www.km.kongsberg.com/ks/web/nokbg0397.nsf/AllWeb/D1084BB7DD0FD21DC12574C0003E01EA/$file/GeoPulse_Profiler.pdf?OpenElement; GeoAcoustics Limited, UK; A Kongsberg Company.

GlobalMap Sport; Installation and Operation Instructions; Lowrance Electronics, Inc.; © 1996; 61 pages.

GPS Speed Correction; Sidescan Sonar; [online]; Retrieved from the Internet URL: <www.hydrakula.uni-kiel.de/downloads/Sidescan%20Sonar.doc; 10 pages.

Humminbird 1197c Operations Manual; Nov. 6, 2007; 188 pages.

Humminbird 200DX Dual Beam Operations Manual; 43 pages.

Humminbird 500 Series; 550, 560, 570 and 570 DI Operations Manual; © 2010; 84 pages.

Humminbird: America's favorite Fishfinder—The leading innovator of Side Imaging technology; [Online]; [Retrieved on Mar. 16, 2011]; Retrieved from the Internet <URL: http://www.humminbird.com/support/ProductManuals.aspx>; 20 pages.

Humminbird: America's favorite Fishfinder—The leading innovator of Side Imaging technology; [Online]; [Retrieved on Mar. 16, 2011]; Retrieved from the Internet <URL: http://www.humminbird.com/support/ProductManuals.aspx>; 5 pages.

Humminbird Dimension 3 Sonar 600 Operations Manual; 24 pages.

The Humminbird GPS Navigational System. Nothing Else Even Close.; Humminbird Marine Information Systems ®; 1992; 10 pages.

Humminbird GPS NS 10 Operations Manual; 75 pages.

Humminbird High Speed Transducer; 4 pages.

Humminbird LCR 400 ID Operations Manual; 28 pages.

Humminbird Marine Information Systems; Dimension 3 Sonar™; 1992; 16 pages.

Humminbird "Matrix 35 Fishing System," Prior to Aug. 2, 2003.

Humminbird Matrix 35 Fishing System; 2 pages.

Humminbird Matrix 55 and 65 Operations Manual; © 2003; 40 pages.

Humminbird Matrix 67 GPS Trackplotter Operations Manual; © 2003; 88 pages.

Humminbird "Matrix 97 GPS Trackplotter Operations Manual" 2003.

Humminbird Matrix 97 Operations Manual; © 2003; 87 pages.

Humminbird Matrix™ 87c Operations Manual; © 2004; 45 pages.

Humminbird The New Wave of Wide; 1997; Humminbird Wide®; fish wide open!®; 24 pages.

Humminbird NS25 Operations Manual; 71 pages.
Humminbird Piranha 1 & 2 Operation Guide; 5 pages.
Humminbird Platinum ID 120 Operations Manual; 36 pages.
Humminbird Platinum ID 600 Operations Manual; 18 pages.
Humminbird "The Product Line>Matrix Products>Matrix 35" http://web.archive.org/web/20030404000447/www.humminbird.com/hb_Products.asp?ID, Apr. 4, 2003.
Humminbird® Trolling Motor Mounted Transducer with Mount Assembly Brochure; © 2008 Humminbird®, Eufaula, AL; 2 pages.
Humminbird Wide 3D Paramount Operations Manual; 44 pages.
Humminbird Wide 3D View Operations Manual; 38 pages.
Humminbird Wide 3D Vision Operations Manual; 38 pages.
Humminbird Wide 3D Vista Operations Manual; 38 pages.
Humminbird Wide Eye Operations Manual; 32 pages.
Humminbird Wide Paramount Operations Manual; fish wide open!; 32 pages.
Humminbird "Wideside"; Schematic; Dec. 15, 1994; 5 pages.
Hydro Products; A Tetra Tech Company; 4000 Series Gifft Precision Depth Recorder Product Brochure; date stamped 1977.
The Hydrographic Society—Corporate Member News—Kongsberg Simrad; Jul. 3, 2008; 7 pages.
Imagenex Model 855 Brochure: Online; Documents retrieved from internet web archives as follows: URL:http://web.archive.org/web/20021023212210/http:/www.imagenex.com/Products/855_858/855_858.html; 1 page; Archived on Oct. 23, 2002 URL:http://web.archive.org/web/20021024124035/http:/www.imagenex.com/Products/855_858/855.html; 1 page; Archived on Oct. 24, 2002 URL:http://web.archive.org/web/20021024125254/http:/www.imagenex.com/Products/855_858/858/858.html; 1 page; Archived on Oct. 24, 2002 URL:http://web.archive.org/web/20030424071306/http:/www.imagenex.com/855_Page_1.jpg; 1 page; Archived on Apr. 24, 2003 URL:http://web.archive.org/web/20030424091547/http:/www.imagenex.com/855_Page_2.jpg; 1 page; Archived on Apr. 24, 2003 URL:http://web.archive.org/web/20030424094158/http:/www.imagenex.com/855_Page_3.jpg; 1 page; Archived on Apr. 24, 2003 URL:http://web.archive.org/web/20030424101301/http:/www.imagenex.com/855_Page_4.jpg; 1 page; Archived on Apr. 24, 2003 URL:http://web.archive.org/web/20030424101939/http:/www.imagenex.com/855_Page_5.jpg; 1 page; Archived on Apr. 24, 2003 URL:http://web.archive.org/web/20030424135458/http:/www.imagenex.com/855_Page_6.jpg; 1 page; Archived on Apr. 24, 2003 URL:http://web.archive.org/web/20030424141232/http:/www.imagenex.com/855_Page_7.jpg; 1 page; Archived on Apr. 24, 2003 URL:http://web.archive.org/web/20030424143158/http:/www.imagenex.com/855_Page_8.jpg; 1 page; Archived on Apr. 24, 2003
Imagenex Model 872 "Yellowfin" Sidescan Sonar; Imagenex Technology Corp.; © 2004-2009.
The Imagenex SportScan; Digital Sidescan Sonar; "Redefining Image Clarity"; Imagenex Technology Corp.; © 2002.
Imagenex SportScan Digital SideScan Sonar Brochure: Online; Documents retrieved from internet web archives as follows: URL:http://web.archive.org/web/20030212030409/http://www.imagenex.com/Products/products.html; 1 page; Archived on Feb. 12, 2003 URL:http://web.archive.org/web/20030214044915/http://www.imagenex.com/Products/SportScan/sportscan.html; 1 page; Archived on Feb. 14, 2003 URL:http://web.archive.org/web/20030222152337/http://www.imagenex.com/Products/SportScan/SportScan_Specs/sportscan_specs.html; 3 pages; Archived on Feb. 22, 2003 URL:http://web.archive.org/web/20030222161450/http://www.imagenex.com/Products/SportScan/FAQ_s/faq_s.html; 4 pages; Archived on Feb. 22, 2003 URL:http://web.archive.org/web/20030419024526/http://www.imagenex.com/Products/SportScan/distributors.html; 2 pages; Archived on Apr. 19, 2003.
Imagenex (Various) Technical Specifications and User's Manual; Prior to Aug. 2003.
Innomar—Products; "System Variants: SES Side Scan Option"; Retrieved from internet URL:http://www.innomar.com/produ_2000sidescan.htm; Dec. 30, 2003; 2 pages.
International Search Report and Written Opinion for Application No. PCT/US2010/039441 dated Oct. 11, 2010.
International Search Report and Written Opinion for Application No. PCT/US2010/039443 dated Oct. 6, 2010.

"ITC Application Equations for Underwater Sound Transducers"; Published by International Transducer Corporation, 1995, Rev. 8/00; 3 pages.
Kelvin Hughes Transit Sonar; ". . . A new dimension in shallow water survey to assist in . . . "; Hydrography; Dredging; Salvage; Underwater Construction and Similar Works; Mar. 1966; 8 pages.
Klein Digital Sonar Systems, ". . . The Next Generation From the World Leader in Side Scan Sonar and Sub-bottom Profiling Systems," 1988.
Lowrance HS-3DWN Transducer Assembly and Housing (Eagle IIID); Aug. 1994.
Lowrance LCX-18C & LCX-19C Fish-finding Sonar & Mapping GPS; Operation Instructions; © 2002; 200 pages.
Lowrance Transducers Product Information; 1 page.
Navico Design Report of Raytheon Electronics Side Looker Transducer; Mar. 12, 2010; 18 pages.
NOAA: Nautical Charting general information from public records; [Online]; Retrieved on Sep. 10, 2010 from the Internet < URL: http://www.nauticalcharts.noaa.gov/csdl/learn_hydroequip.html; 2 pages; http://www.nauticalcharts.noaa.gov/csdl/learn_hydroequip.html; 1 page; http://www.nauticalcharts.noaa.gov/csdl/PDBS.html; 2 pages; http://www.nauticalcharts.noaa.gov/hsd/pub.html; 1 page; http://www.nauticalcharts.noaa.gov/hsd/fpm/fpm.htm; 1 page; http://www.ozcoasts.gov.au/geom_geol/toolkit/Tech_CA_sss.jsp; 12 pages.
ONR Grant N66604-05-1-2983; Final Report; "Cooperative Autonomous Mobile Robots"; Retrieved from the Internet <URL: http://dodreports.com/pdf/ada463215.pdf; Post 2006.
Odom Echoscan™: For Sea Floor or Riverbed Surveys; Odom Hydrographic Systems; Apr. 26, 2002.
Odom Hydrographic Systems ECHOSCAN Manual; Revision 1.11; Apr. 26, 2002.
"Product Survey Side-Scan Sonar"; Hydro International Magazine; vol. 36; Apr. 2004; pp. 36-39.
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
SeaBat 8101 Product Specification; 240kHz Multibeam Echo Sounder; © 1999 RESON Inc.; Version 4.0.
Simrad EA 500; Hydrographic Echo Sounder; Product Specifications; Revision: Sep. 1993.
SonarBeam Underwater Surveying System Using T-150P tow-fish hull mounted; [Online]; [Retrieved on Feb. 12, 2010 from the Internet <URL: http://dsmeu.en.ec21.com/Remotely_Operated_Sonar_Boat_System—618904_2479905.html; 4 pages; http://www.remtechnology.en.ec21.com/Side_Scan_Sonar_Remotely_Operated—2902034.html; 4 pages; [Retrieved on Feb. 16, 2010 from the Internet <URL: http://dsmeu.en.ec21.com/Remotely_Operated_Sonar_Boat_System—618904_2479905.html; 4 pages; http://www.remtechnology.en.ec21.com/Side_Scan_Sonar_Remotely_Operated—2902230.html; 7 pages.
Starfish 450H; Sidescan System; Tritech International Limited; UK.
T297-00-01-01 Transducer housing outline drawing; Neptune Sonar Ltd.; © 2002.
Techsonic Industries, Inc.; "Mask, Acoustic"; Schematic, May 24, 1996.
Techsonic Industries, Inc.; "Element, 455 kHz"; Schematic, Jun. 13, 1996.
"Transducers Quad Beam," Prior to Aug. 2, 2003.
U-Tech Company Newsletter.
USACE, "Chapter 11, Acoustic Multibeam Survey Systems for Deep-Draft Navigation Projects," Apr. 1, 2004.
Ultra III 3D Installation and Operation Instructions; EAGLE™; © 1994.
Westinghouse Publication; "Side-Scan Sonar Swiftly Surveys Subsurface Shellfish"; May 1970; 4 pages.
Sonar Theory and Applications; Excerpt from Imagenex Model 855 Color Imaging Sonar User Manual; Imagenex Technology Corp.; Canada; 8 pages.
Imagenex Technology Corp.; YellowFin SideScan Sonar, (Model 872); user's manual; data storage file format; Ethernet interface specification, and Ethernet setup guide; Nov. 2004; 46 pages.

Office Action for Reexamination No. 90/009,956; dated Apr. 6, 2012; 32 pages.
Office Action for Reexamination No. 90/009,957; dated Jun. 4, 2012; 17 pages.
Office Action for Reexamination No. 90/009,958; dated Jun. 18, 2012; 19 pages.
Office Action for U.S. Appl. No. 11/195,107; dated Feb. 15, 2007; 5 pages.
Office Action for U.S. Appl. No. 11/195,107; dated Aug. 9, 2007; 7 pages.
Office Action for U.S. Appl. No. 11/195,107; dated Mar. 4, 2008; 7 pages.
Office Action for U.S. Appl. No. 11/195,107; dated Jul. 17, 2008; 7 pages.
Office Action for U.S. Appl. No. 11/195,107; dated May 12, 2009; 9 pages.
Office Action for U.S. Appl. No. 12/319,594; dated Jun. 8, 2009; 10 pages.
Office Action for U.S. Appl. No. 12/319,586; dated Sep. 3, 2009; 5 pages.
Office Action for U.S. Appl. No. 12/319,586; dated Mar. 2, 2010; 5 pages.
Office Action for U.S. Appl. No. 12/319,604; dated Sep. 29, 2009; 7 pages.
Office Action for U.S. Appl. No. 12/631,229; dated Sep. 9, 2010, 8 pages.
Response to European Search Report for European Patent Application No. 05782717.2-2220; dated Mar. 23, 2012; Johnson Outdoors, Inc.; 35 pages.
International Search Report for Application No. PCT/US05/27436 dated Nov. 20, 2007; 1 page.
International Preliminary Report on Patentability for Application No. PCT/US05/27436 dated Dec. 6, 2007; 5 pages.
Translation of Notice of Reason(s) for Rejection for Japanese Application No. 2007-524919 dated Aug. 16, 2011; 4 pages.
Communication [extended European Search Report] for European Application No. 05782717.2-2220 dated Aug. 31, 2011; 12 pages.
Communication for European Patent Application No. 05782717.2-2220 dated May 11, 2012; 9 pages.
Australian Government, Department of Sustainability, Environment, Water, Population and Communities; Fact Sheet—The RV Tangaroa; date unknown; 3 pages.
Blondel, Philippe; The Handbook of Sidescan Sonar; © 2009; 316 pages.
Calcutt, Ron; Lowrance Book of Sonar & GPS; © 1986; and Lowrance Book of Sonar & GPS Update; 1997; collectively 122 pages.
Derrow, II, Robert W. et al., A Narrow-Beam, Side-Looking Sonar for Observing and Counting Fish in Shallow Aquaculture Ponds; 1996; 34 pages.
DSME E&R LTD.; Remotely Operated Sonar Boat System (SB-100S); http://dsmeu.en.ec21.com/Remotely_Operated_Sonar_Boat_System-618904_2479905.html;printed on Feb. 12, 2010; 3 pages.
Eagle Electronics; Ultra 3D Installation and Operation Manual; © 2002; 24 pages.
Furuno Electric Co., LTD., Side Looking Sonar, Model SL-16, 1983; 4 pages.
Geoacoustics; GeoPulse, Profiler System; Feb. 2006, 2 pages.
Humminbird 1198C Review for Catfishing, Catfishing "How to" Catfishing Techniques, Oct. 31, 2011, 9 pages.
Imagenex Technology Corp., Model 881 SportScan, Single or Dual Frequency Digital Sidescan Sonar, Software User's Manual; May 9, 2003; 16 pages.
Klein Associates, Inc.; Modular Side Scan Sonar and Sub-Bottom Profiler System Components for Customized Configurations; date unknown; 10 pages.
Klein, Martin; Side Scan Sonar; UnderSea Technology; Apr. 1967; 4 pages.
Klein, M. et al., Sonar—A modern technique for ocean exploitation; IEEE Spectrum; Jun. 1968; pp. 40-46 and Authors page.
Klein, Martin; New Developments in Side Scan Sonar for Hydrography; date unknown; 14 pages.

Klein, Martin; Side Scan Sonar; Offshore Services; Apr. 1977, pp. 67, 68, 71, 72, 75.
Klein, Martin; New Capabilities of Side Scan Sonar Systems; date unknown; pp. 142-147.
Klein, Martin; Sea Floor Investigations Using Hybrid Analog/Digital Side Scan Sonar; date unknown; 18 pages.
Kongsberg Maritime AS; Side Looking Transducer, 200 kHz-0.5x49, 200 kHz side looking transducer for shallow water and surveying and high resolution; date unknown; 2 pages.
Kongsberg Simrad AS; ConCat Containerised Catamaran, Inshore hydrographic survey, vessel that fits in a container, Rev. B, Apr. 2004; 4 pages.
Kvitek, Rikk et al.; Final Report, Early Implementation of Nearshore Ecosystem Database Project Tasks 2 and 3; http://seafloor.csumb.edu/taskforce/html%202%20web/finalreport.htm; Jul. 29, 199; 92 pages.
Law, G., Sideways Glance, Side- and down-scan Imaging Open New Windows in Fishing Finding, Electronics, Nov. 2011, pp. 28-29.
Leonard, John L.; Cooperative Autonomous Mobile Robots; date unknown; 11 pages.
Maritime surveys takes delivery of SeaBat 8160; Sea Technology, Jul. 2001; http://fmdarticles.com/p/articles/mi_qa5367/is_200107/ai_n21475675/; webside printed Jun. 30, 2010.
Marine Sonic Technology, LTD.; Sea Scan® PC Side Scan Sonar System Information/Specifications Sheet; Sep. 9, 2002; 10 pages.
Mesotech; Mesotech Model 971 Sonar System Summary; Mar. 26, 1985, 2 pages.
Oughterson, B., Sophisticated Sonar Reveals Detailed Images Recently Unimaginable. Is It Too Much too Soon?, Basic Instincts, pp. 75-78.
Raymarine, L750 Fishfmder, Operation Handbook; date unknown; 93 pages.
Raytheon Marine Company; Installation Instructions; Oct. 1998; 2 pages.
Remtechsroy Group; Side Scan Sonar-Remotely Operated Vehicle Surface; http://remtechnology.en.ec21.com/Side_Scan_Sonar_Remotely_Operated-2902034_2902230.html;printed on Feb. 12, 2010; 4 pages.
Reson Inc.; SeaBat 8101 Product Specification, 240kHz Multibeam Echo Sounder; © 1999; 2 pages.
Reson; SeaBat 8101; Multibeam acoustic echosounder; date unknown; 1 page.
Reson; SeaBat 8160 Product Specification, Multibeam Echosounder System; date unknown; 2 pages.
Russell-Cargill, W.G.A. ed.; Recent Developments in Side Scan Sonar Techniques; © 1982; 141 pages.
Simrad; Product Specifications, Simrad EA 500 Side-looking Option; Feb. 1992, 1 page.
Techsonic Industries, Inc., Humminbird Wide fish wide open!; brochure, 1997; 4 pages.
Techsonic Industries, Inc.; Humminbird GPS brochure; © 1992; 10 pages.
Teleflex Electronic Systems; Humminbird 1997; © 1996; 24 pages.
The Norwegian and Finnish navies performing operations with the Kongsberg Hugin AUV and minesniper mine disposal vehicle in Finnish waters; FFU nytt; No. 3, Nov. 2003; p. 12.
Trabant, Peter K.; Applied High-Resolution Geophysical Methods, Offshore Geoengineering Hazards; © 1984; 265 pages.
Tritech International Limited; StarFish; 450H Hull-Mounted Sidescan System; date unknown; 2 pages.
Universal Sonar Limited; High Frequency Broad Band Line Array Type G27/300LQ; date unknown 2 pages.
Williams, J. P., Glancing Sideways, Nautical Know-How, Chesapeake Bay Magazine, May 2011, pp. 14-17.
International Search Report and Written Opinion for Application No. PCT/US2012/046062 dated Dec. 14, 2012.
Search Report for European Application No. 12195752.6; dated Mar. 7, 2013.
Office Action for European Application No. 10728530.6; dated Apr. 2, 2013.

Office Action for European Application No. 10729001.7; dated Apr. 5, 2013.

De Jong, C. D., et al.; "*Hydrography: Series on Mathematical Geodesy and Positioning*;" VSSD; ISBN 90-407-2359-1; dated 2002.

Berktay, H. O., et al.; "*Fairfield performance of parametric transmitters*;" Journal of Acoustical Society of America, vol. 55, No. 3; dated Mar. 1974.

Fried, N. W.; "*An Investigation of a Large Step-Down Ratio Parametric Sonar and Its Use in Sub-Bottom Profiling*;" Thesis: Simon Fraser Universityl dated Aug. 1992.

Hardiman, J. E., et al.; "*High Repetition Rate Side Looking Sonar*;" Oceans 2002 MTSIEEE, vol. 4, dated Oct. 2002.

Naoi, J., et al.; "*Sea Trial Results of a Cross Fan Beam Type Sub-Bottom Profiler*;" Japanese Journal of Applied Physics, vol. 39, No. 5; dated May 2000.

Plueddemann, A. J., et al.; "*Design and Performance of a Self-Contained Fan-Beam ADCP*;" IEEE Journal of Applied Physics, vol. 39, No. 5; dated May 2000.

Riordan, J., et al.; "*Implementation and Application of a Real-time Sidescan Sonar Simulator*," Oceans 2005—Europe, vol. 2; dated Jun. 2005.

Yang, L., er al.; "*Bottom Detection for Multibeam Sonars with Active Contours*;" MTSIEEE Conference Proceedings, vol. 2; dated Jun. 2005.

"*100 W adjustable Wide-Beam: Transom-Mount Transducer—P48W*;" Airmar Technology Corporation; <www.airmar.com>.

Extended European Search Report for Application No. 13153403.4; dated May 7, 2013.

\* cited by examiner

SIDE VIEW:

TOP VIEW:

DOWNSCAN IMAGING SONAR FOR REDUCED INTERFERENCE

RELATED APPLICATION

The present invention is a Continuation of U.S. patent application Ser. No. 12/460,139, filed Jul. 14, 2009, entitled "Downscan Imaging Sonar," which is incorporated by reference in its entirety.

FIELD OF THE INVENTION

Embodiments of the present invention relate generally to sonar systems, and more particularly, to providing a downscan imaging sonar using a linear transducer.

BACKGROUND OF THE INVENTION

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Devices such as transducer elements, or simply transducers, have been developed to produce sound or vibrations at a particular frequency that is transmitted into and through the water and also to detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer (e.g., a cylindrical shaped crystal with a circular face) typically creates a conical shaped beam with the apex of the cone being located at the source. Any reflected sound then returns to the transducer to form a return signal that may be interpreted as a surface of an object. Such transducers have often been directed in various directions from surfaced or submerged vessels in order to attempt to locate other vessels and/or the seabed for the purposes of navigation and/or target location.

Since the development of sonar, display technology has also been improved in order to enable better interpretation of sonar data. Strip chart recorders and other mechanical output devices have been replaced by, for example, digital displays such as LCDs (liquid crystal displays). Current display technologies continue to be improved in order to provide, for example, high quality sonar data on multi-color, high resolution displays having a more intuitive output than early sonar systems were capable of producing.

With display capabilities advancing to the point at which richly detailed information is able to be displayed, attention has turned back to the transducer in order to provide higher quality data for display. Furthermore, additional uses have been developed for sonar systems as transducer and display capabilities have evolved. For example, sonar systems have been developed to assist fishermen in identifying fish and/or the features that tend to attract fish. Historically, these types of sonar systems primarily analyzed the column of water beneath a watercraft with a cylindrical piezo element that produces a conical beam, known as a conical beam transducer or simply as a circular transducer referring to the shape of the face of the cylindrical element. However, with the advent of sidescan sonar technology, fishermen were given the capability to view not only the column of water beneath their vessel, but also view water to either side of their vessel.

Sidescan sonar can be provided in different ways and with different levels of resolution. As its name implies, sidescan sonar is directed to look to the side of a vessel and not below the vessel. In fact, many sidescan sonar systems (e.g., swath and bathymetry sonar systems) have drawn public attention for their performance in the location of famous shipwrecks and for providing very detailed images of the ocean floor, but such systems are costly and complex. Sidescan sonar typically generates a somewhat planar fan-shaped beam pattern that is relatively narrow in beamwidth in a direction parallel to the keel of a vessel deploying the sidescan sonar and is relatively wide in beamwidth in a direction perpendicular to the keel of the vessel. It may be provided in some cases using multibeam sonar systems. Such multibeam sonar systems are typically comprised of a plurality of relatively narrowly focused conventional circular transducer elements that are arrayed next to each other to produce an array of narrowly focused adjacent conical beams that together provide a continuous fan shaped beam pattern. FIG. 1 shows an example of a series of conventional (generally circular) transducer elements 10 arrayed in an arc to produce a multibeam sonar system. FIG. 2 shows a typical fan shaped beam pattern 12 produced by the multibeam sonar system of FIG. 1 as the beam pattern is projected onto the seabed.

However, multibeam sonar systems typically require very complex systems to support the plurality of transducers that are employed in order to form the multibeam sonar system. For example, a typical system diagram is shown in FIG. 3, which includes a display 20 driven by a sonar signal processor 22. The sonar signal processor 22 processes signals received from each of a plurality of transducers 26 that are fed to the sonar signal processor 22 by respective different transceivers 24 that are paired with each of the transducers 26. Thus, conventional multibeam sonar systems tend to include a large number of transceivers and correspondingly introduce complexity in relation to processing the data such systems produce.

More recently, ceramic sidescan transducer elements have been developed that enable the production of a fan shaped sonar beam directed to one side of a vessel. Accordingly, the sea floor on both sides of the vessel can be covered with two elements facing on opposite sides of the vessel. These types of sidescan transducer elements are linear, rather than cylindrical, and provide a somewhat planar fan-shaped beam pattern using a single transducer to provide sidescan sonar images without utilizing the multibeam array described above. However, employment of these types of sidescan elements typically leaves the column of water beneath the vessel either un-monitored, or monitored using conical beam or circular transducers. In this regard, FIG. 4 illustrates an example of a conventional sidescan sonar with linear sidescan transducer elements oriented to produce fan-shaped beams 27 directed from opposite sides of the vessel and a conical beam 28 projecting directly below the vessel. These conical beams have conventionally been provided using conventional cylindrical transducers to produce depth information since sidescan transducers are typically not as useful for providing depth or water column feature information, such as fish targets. However, cylindrical transducers provide poor quality images for sonar data relating to the structure on the bottom or in the water column directly below the vessel.

Accordingly, it may be desirable to develop a sonar system that is capable of providing an improved downscan imaging sonar.

BRIEF SUMMARY OF THE INVENTION

Accordingly, embodiments of the present invention employ a linear transducer, directed downward to receive high quality images relative to the water column and bottom features directly beneath the linear transducer and the vessel on which the linear transducer is employed. Some other embodiments, in addition to the use of a linear transducer directed downward, also employ at least one sidescan transducer element (e.g., a linear transducer oriented away from the side of the vessel) to ensonify (e.g., emit sonar pulses and detect echo returns) the sea floor on the sides of a vessel. Accordingly, better quality sonar images may be provided for the water column and bottom features beneath the vessel, of a quality that was unavailable earlier. Moreover, embodiments of the present invention may simplify the processing involved in producing high quality sonar images.

In one exemplary embodiment, a transducer array is provided. The transducer array may include a housing and a linear transducer element. The housing may be mountable to a watercraft capable of traversing a surface of a body of water. The linear transducer element may be positioned within the housing and may have a substantially rectangular shape configured to produce a sonar beam having a beamwidth in a direction parallel to longitudinal length of the linear transducer element that is significantly less than a beamwidth of the sonar beam in a direction perpendicular to the longitudinal length of the transducer element. The linear transducer element may also be positioned within the housing to project sonar pulses in a direction substantially perpendicular to a plane corresponding to the surface.

In another exemplary embodiment, a transducer array is provided. The transducer array may include a plurality of transducer elements and each one of the plurality of transducer elements may include a substantially rectangular shape configured to produce a sonar beam having a beamwidth in a direction parallel to longitudinal length of the transducer elements that is significantly less than a beamwidth of the sonar beam in a direction perpendicular to the longitudinal length of the transducer elements. The plurality of transducer elements may be positioned such that longitudinal lengths of at least two of the plurality of transducer elements are parallel to each other. The plurality of transducer elements may also include at least a first linear transducer element, a second linear transducer element and a third linear transducer element. The first linear transducer element may be positioned within the housing to project sonar pulses from a first side of the housing in a direction generally perpendicular to a centerline of the housing. The second linear transducer element may be positioned within the housing to lie in a plane with the first linear transducer element and project sonar pulses from a second side of the housing that is generally opposite of the first side. The third linear transducer element may be positioned within the housing to project sonar pulses in a direction generally perpendicular to the plane.

In another exemplary embodiment, a sonar system is provided. The sonar system may include a transducer array and a sonar module. The transducer array may include a plurality of transducer elements and each one of the plurality of transducer elements may include a substantially rectangular shape configured to produce a sonar beam having a beamwidth in a direction parallel to longitudinal length of the transducer elements that is significantly less than a beamwidth of the sonar beam in a direction perpendicular to the longitudinal length of the transducer elements. The plurality of transducer elements may be positioned such that longitudinal lengths of at least two of the plurality of transducer elements are parallel to each other. The plurality of transducer elements may also include at least a first linear transducer element, a second linear transducer element and a third linear transducer element. The first linear transducer element may be positioned within the housing to project sonar pulses from a first side of the housing in a direction generally perpendicular to a centerline of the housing. The second linear transducer element may be positioned within the housing to lie in a plane with the first linear transducer element and project sonar pulses from a second side of the housing that is generally opposite of the first side. The third linear transducer element may be positioned within the housing to project sonar pulses in a direction generally perpendicular to the plane. The sonar module may be configured to enable operable communication with the transducer array. The sonar module may include a sonar signal processor configured to process sonar return signals received via the transducer array, and a transceiver configured to provide communication between the transducer array and the sonar signal processor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 17A:
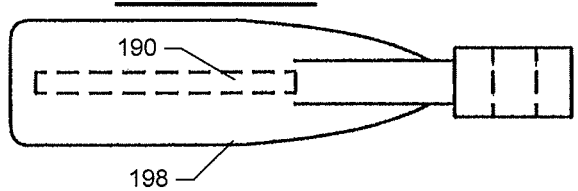
FIG. 17A is a diagram showing a perspective view of a linear downscan transducer within a single housing from a point above the housing according to an exemplary embodiment of the present invention.
Figure 17B:
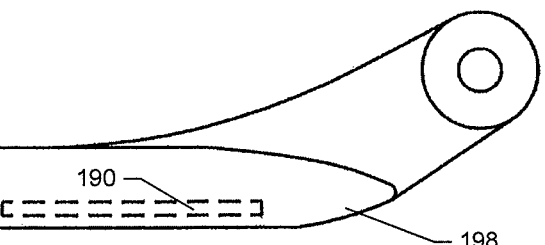
Figure 17C:
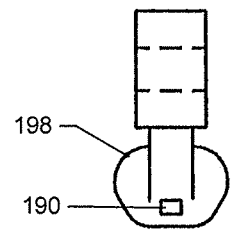

FIG. 17B is a perspective view from one side of the housing of FIG. 17A at a point substantially perpendicular to a longitudinal axis of the housing according to an exemplary embodiment of the present invention; and FIG. 17C is a perspective view from the front side of the housing of FIG. 17A at a point looking straight down the longitudinal axis of the housing according to an exemplary embodiment of the present invention.

DETAILED DESCRIPTION OF THE INVENTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
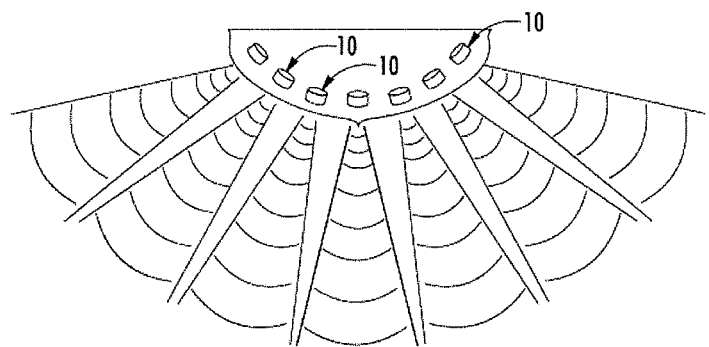
FIG. 1 is a diagram illustrating an example of a series of conventional transducer elements 10 arrayed to produce a multibeam sonar system.
Figure 2:
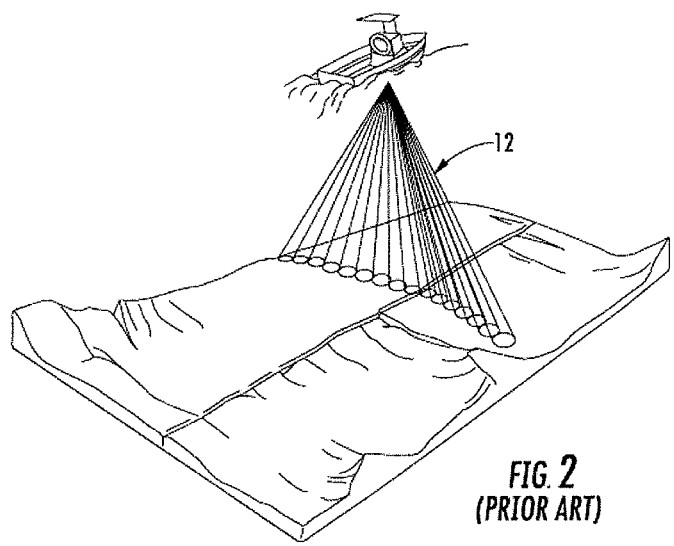
FIG. 2 illustrates a fan shaped beam pattern produced by the conventional multibeam sonar system of FIG. 1 as the beam pattern is projected onto the seabed.
Figure 3:
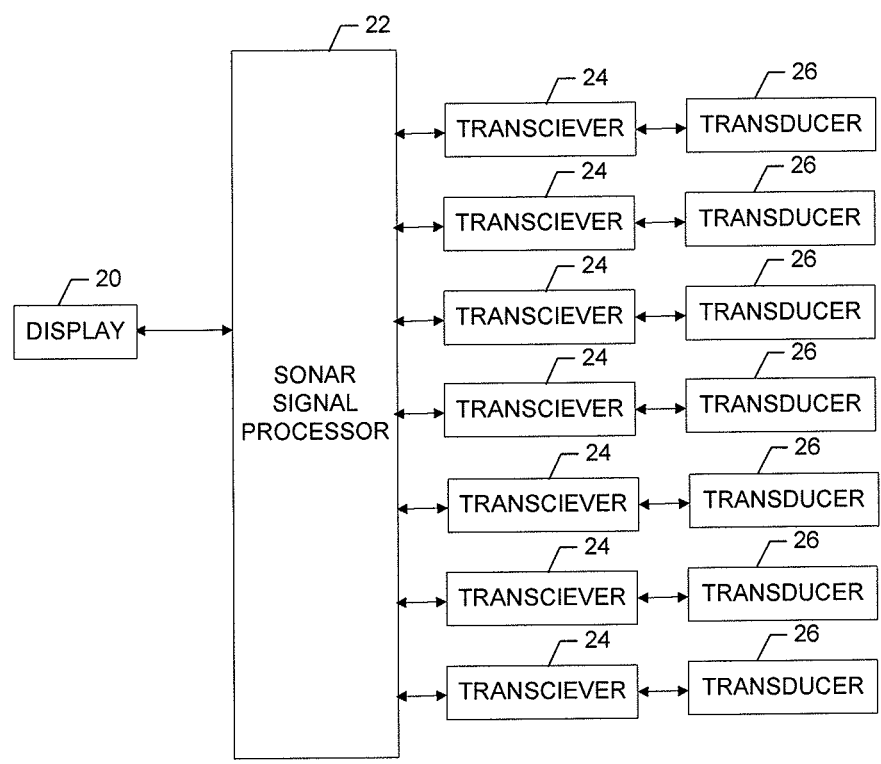
FIG. 3 is a block diagram of a conventional multibeam sonar system for the system shown in FIG. 1.
Figure 4:
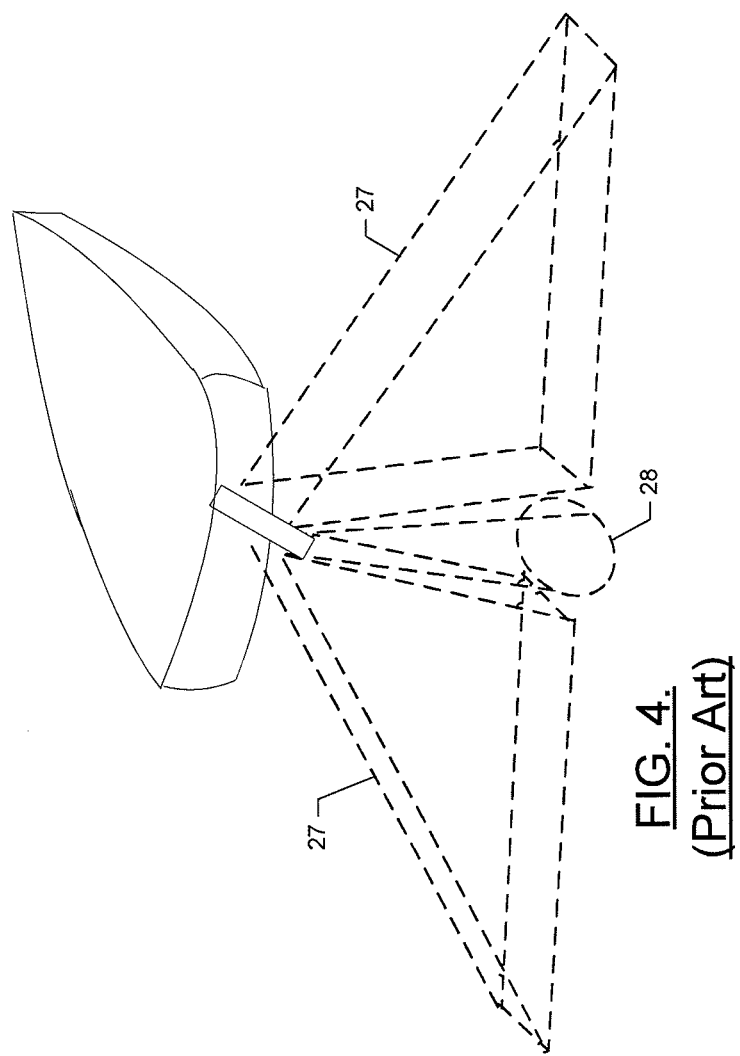
FIG. 4 is a diagram illustrating a conventional sidescan sonar system.
Figure 5:
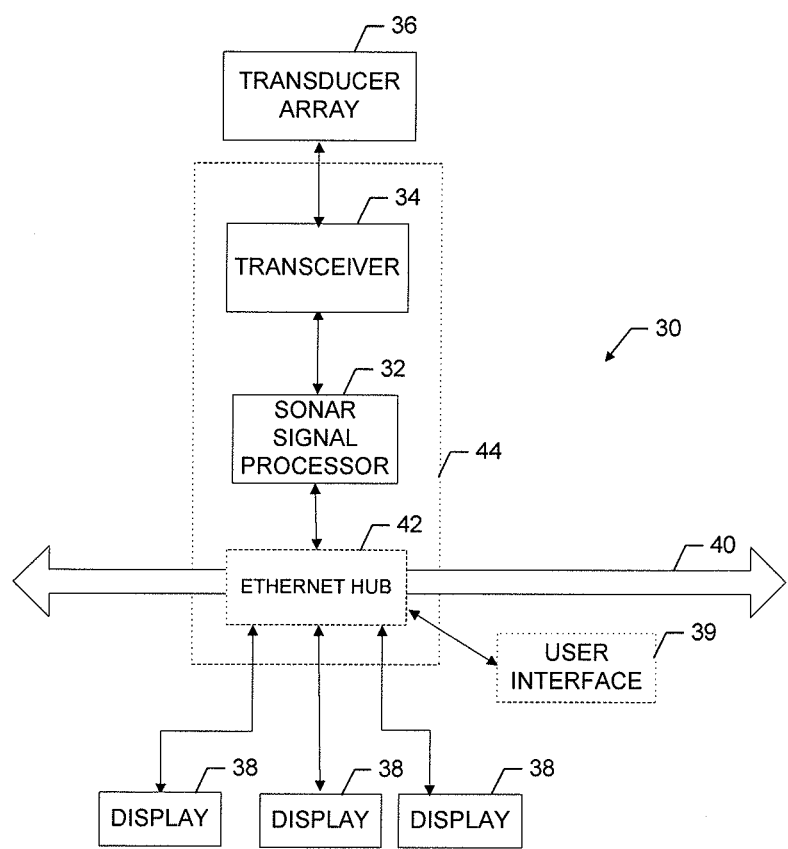
FIG. 5 is a basic block diagram illustrating a sonar system according to an exemplary embodiment of the present invention.

FIG. 5 is a basic block diagram illustrating a sonar system 30 for use with multiple exemplary embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer array 36 and/or numerous other peripheral devices such as one or more displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks.

The display 38 may be configured to display images and may include or otherwise be in communication with a user interface 39 configured to receive an input from a user. The display 38 may be, for example, a conventional LCD (liquid crystal display), a touch screen display, or any other suitable display known in the art upon which images may be rendered. Although each display 38 of FIG. 5 is shown as being connected to the sonar signal processor 32 via the network and/or via an Ethernet hub, the display 38 could alternatively be in direct communication with the sonar signal processor 32 in some embodiments, or the display 38, sonar signal processor 32 and user interface 39 could be in a single housing. The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

The transducer array 36 according to an exemplary embodiment may be provided in one or more housings that provide for flexible mounting with respect to a hull of the vessel on which the sonar system 30 is employed. In this regard, for example, the housing may be mounted onto the hull of the vessel or onto a device or component that may be attached to the hull (e.g., a trolling motor or other steerable device, or another component that is mountable relative to the hull of the vessel), including a bracket that is adjustable on multiple axes, permitting omnidirectional movement of the housing. The transducer array 36 may include one or more transducer elements positioned within the housing, as described in greater detail below, and each of the transducer elements may be configured to be directed to cover a different area such that one transducer element covers one side of the vessel with a fan shaped beam, another transducer element covers the opposite side of the vessel with a fan shaped beam, and the third fan shaped beam covers a region between the other transducer elements directed below the vessel. In an exemplary embodiment, each of the transducer elements of the transducer array 36 may be substantially identical in terms of construction and therefore may be different only by virtue of the orientation of the respective transducer elements. The transducer array 36 may be configured to both transmit and receive sound pressure waves. However, in some cases, the transducer array 36 could include separate elements for transmission and reception. The transducer array 36 is described in greater detail below in reference to FIG. 6.

In an exemplary embodiment, the sonar signal processor 32, the transceiver 34 and an Ethernet hub 42 or other network hub may form a sonar module 44. As such, for example, in some cases, the transducer array 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device drivers accessible to the Ethernet hub 42 to enable the Ethernet hub 42 to properly work with displays for which the sonar module 44 is compatible. The sonar module 44 may also be enabled to be upgraded with additional device drivers to enable expansion of the numbers and types of devices with which the sonar module 44 may be compatible. In some cases, the user may select a display type to check whether a the display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer array 36 and for processing data received therefrom. Further capabilities of the sonar signal processor 32 and other aspects related to the sonar module are described in U.S. patent application Ser. No. 12/460,093, entitled "Linear and Circular Downscan Imaging Sonar" filed on even date herewith, the disclosure of which is incorporated herein by reference in its entirety.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include circuitry for providing transmission electrical signals to the transducer array 36 for conversion to sound pressure signals based on the provided electrical signals to be transmitted as a sonar pulse. The transceiver 34 may also include circuitry for receiving electrical signals produced by the transducer array 36 responsive to sound pressure signals received at the transducer array 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns.

Figure 6:
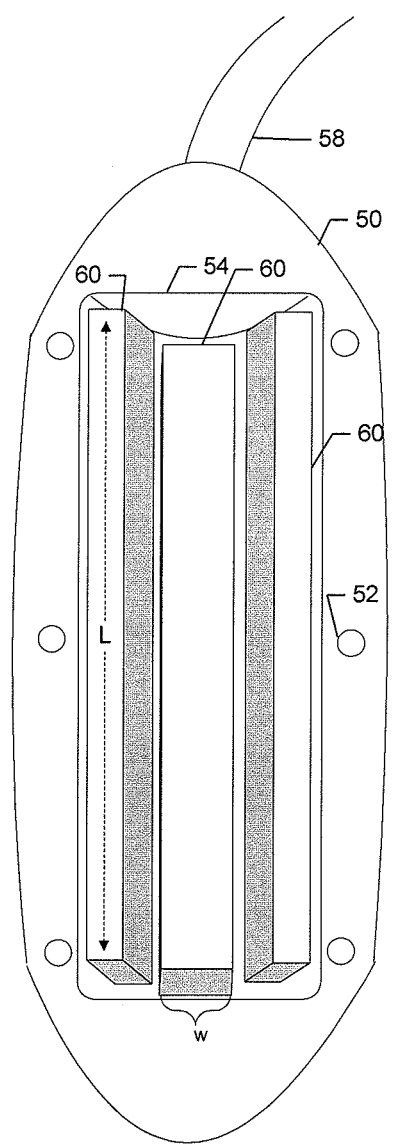
FIG. 6 is a diagram illustrating a more detailed view of a transducer array according to an exemplary embodiment of the present invention.

FIG. 6 is a diagram illustrating a more detailed view of the transducer array 36 according to an exemplary embodiment. As shown in FIG. 6, the transducer array 36 may include a housing 50 that may include mounting holes 52 through which screws, rivets, bolts or other mounting devices may be passed in order to fix the housing 50 to a mounting bracket, a device attached to a vessel or to the hull of the vessel itself. However, in some cases, the housing 50 may be affixed by welding, adhesive, snap fit or other coupling means. The housing 50 may be mounted to a portion of the vessel, or to a device attached to the vessel, that provides a relatively unobstructed view of both sides of the vessel. Thus, for example, the housing 50 may be mounted on or near the keel (or centerline) of the vessel, on a fixed or adjustable mounting bracket that extends below a depth of the keel (or centerline) of the vessel, or on a mounting device that is offset from the bow or stern of the vessel. The housing 50 may include a recessed portion defining containment volume 54 for holding transducer elements 60. The recessed portion defining the containment volume may extend away from the hull of the vessel on which the housing 50 is mounted and therefore protrude into the water on which the vessel operates (or in which the vessel operates in a case where the transducer array 36 is mounted to a tow fish). To prevent cavitation or the production of bubbles due to uneven flow over the housing 50, the housing 50 (and in particular the containment volume portion of the housing) may have a gradual, rounded or otherwise streamlined profile to permit laminar flow of water over the housing 50. In some examples, an insulated cable 58 may provide a conduit for wiring to communicatively couple the transducer elements 60 to the sonar module 44.

Each of the transducer elements 60 may be a linear transducer element. Thus, for example, each of the transducer elements 60 may be substantially rectangular in shape and made from a piezoelectric material such as a piezoelectric ceramic material, as is well known in the art and may include appropriate shielding (not shown) as is well known in the art. The piezoelectric material being disposed in a rectangular arrangement provides for an approximation of a linear array having beamwidth characteristics that are a function of the length and width of the rectangular face of the transducer elements and the frequency of operation. In an exemplary embodiment, the transducer elements 60 may be configured to operate in accordance with at least two operating frequencies. In this regard, for example, a frequency selection capability may be provided by the sonar module 44 to enable the user to select one of at least two frequencies of operation. In one example, one operating frequency may be set to about 800 kHz and another operating frequency may be set to about 455 kHz. Furthermore, the length of the transducer elements may be set to about 120 mm while the width is set to about 3 mm to thereby produce beam characteristics corresponding to a bearing fan of about 0.8 degrees by about 32 degrees at 800 kHz or about 1.4 degrees by about 56 degrees at 455 kHz. However, in general, the length and width of the transducer elements 60 may be set such that the beamwidth of sonar beam produced by the transducer elements 60 in a direction parallel to a longitudinal length (L) of the transducer elements 60 is less than about five percent as large as the beamwidth of the sonar beam in a direction (w) perpendicular to the longitudinal length of the transducer elements 60. (See generally FIGS. 7A, 7B, 9A, 9B.) It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped boundaries, those boundaries merely correspond to the −3 dB (or half power) points for the transmitted beams. In other words, energy measured outside of the boundaries shown is less than half of the energy transmitted. Thus, the boundaries shown are merely theoretical half power point boundaries.

Although dual frequency operations providing a specific beam fan for each respective element for given lengths are described above, it should be understood that other operating ranges could alternatively be provided with corresponding different transducer element sizes and corresponding different beamwidth characteristics. Moreover, in some cases, the sonar module 44 may include a variable frequency selector, to enable an operator to select a particular frequency of choice for the current operating conditions. However, in all cases where the longitudinal length of the transducer elements 60 is generally aligned with the centerline of the vessel, the rectangular shape of the transducer elements 60 provides for a narrow beamwidth in a direction substantially parallel to the centerline of the vessel and wide beamwidth in a direction substantially perpendicular to the centerline of the vessel. However, if the transducer array 36 is mounted in a different fashion or to a rotatable accessory on the vessel (e.g., a trolling motor mount), the fan-shaped beams produced will have the wide beamwidth in a direction substantially perpendicular to the longitudinal length of the transducer elements 60 and a narrow beamwidth in a direction substantially parallel to the longitudinal length of the transducer elements 60. Thus, the sonar could also be oriented to provide fore and aft oriented fan-shaped beams or any other orientation relative to the vessel in instances where motion of the vessel is not necessarily in a direction aligned with the centerline of the vessel.

Figure 7A:
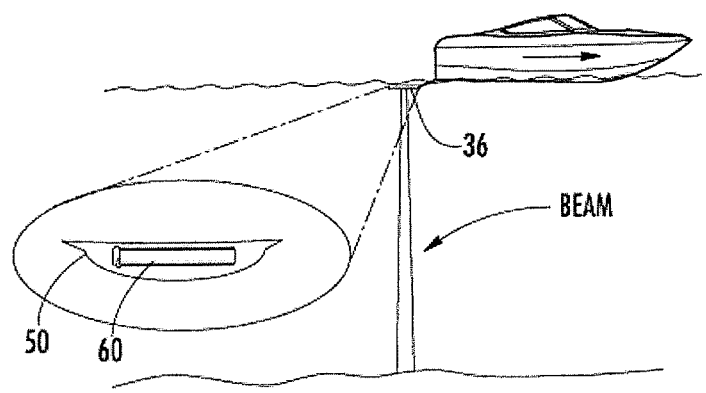
FIG. 7A illustrates a side view showing a beam pattern produced by the transducer array according to an exemplary embodiment of the present invention.
Figure 7B:
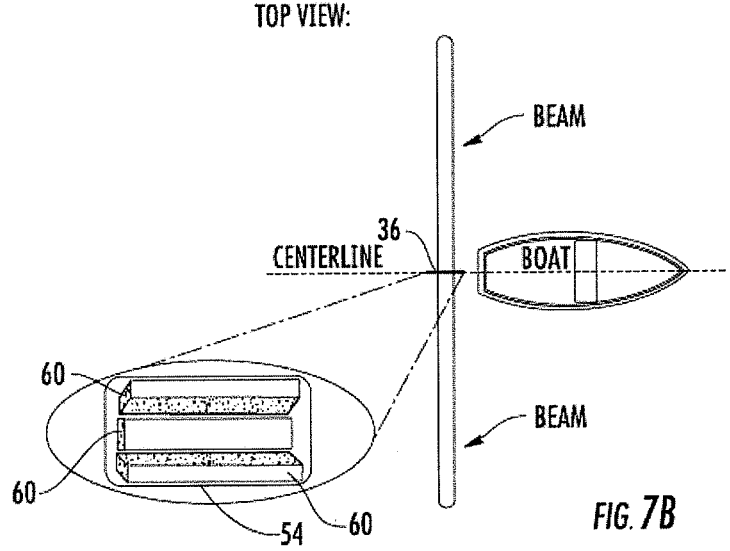
FIG. 7B illustrates a top view showing a beam pattern produced by the transducer array according to an exemplary embodiment of the present invention.

FIGS. 7A and 7B show side and top views, respectively, illustrating the beam characteristics produced by an exemplary embodiment of the present invention. In this regard, FIG. 7A illustrates a side view showing the transducer array 36 mounted to a bracket that extends from the aft end of the centerline of the vessel (e.g., boat). As shown in FIG. 7A, the beam produced by the transducer array 36 is relatively narrow in the direction substantially parallel to the centerline of the vessel if the transducer elements are aligned for a generally coplanar beam. FIG. 7A also includes a cutaway view of the transducer array 36 to show the orientation of the transducer elements 60 in context relative to the vessel according to this example. Meanwhile, FIG. 7B shows a top view of the beam produced by the transducer assembly 36 if the transducer elements are aligned for a generally coplanar beam. As shown in FIG. 7B, the beam produced by the transducer array is relatively wide in the direction substantially perpendicular to the centerline of the vessel thereby producing a fan-shaped beam pattern extending out to both sides and also covering the water column beneath the vessel, as described below. FIG. 7B also includes a cutaway view of the transducer array 36 to show the orientation of the transducer elements 60 in context relative to the vessel according to this example.

Figure 8A:
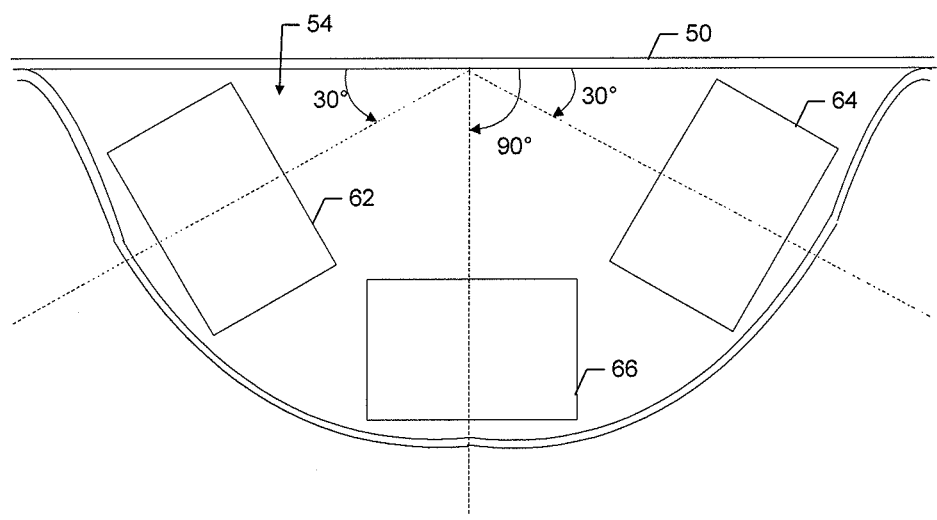
FIG. 8A is a diagram illustrating a cross section of components in a containment volume of a housing according to an exemplary embodiment of the present invention.

FIG. 8A is a diagram illustrating a cross section of components in the containment volume 54 according to an exemplary embodiment. In particular, FIG. 8A illustrates the arrangement of the linear transducer elements 60 within the containment volume 54. The transducer elements 60, which may include a port side element 62 positioned to scan substantially to the port side of the vessel, a starboard side element 64 positioned to scan substantially to the starboard side of the vessel, and a downscan element 66 positioned to scan substantially below the vessel. As shown in FIG. 8A, in an exemplary embodiment, both the port side element 62 and the starboard side element 64 may be oriented to face slightly below a surface of the water on which the vessel travels. In one example, both the port side element 62 and the starboard side element 64 may be oriented such that the widest dimension of the beamwidth of each respective element is centered at 30 degrees below a plane substantially parallel to the surface of the water. Meanwhile, the downscan linear element 66 may be positioned such that the widest dimension of the beamwidth of the downscan element 66 is centered at 90 degrees below the plane substantially parallel to the surface of the water. In other words, the downscan element 66 has the central portion of its fan shape aimed straight down. The containment volume 54 may include electrical connections (not shown) to communicate with the transceiver 34 and supports, struts, rods or other supporting structures to secure each of the linear transducer elements 60 in their respective orientations. The transducer elements 60 may be held in place or otherwise affixed to the supporting structures via adhesive or any other suitable joining material and the angles at which the transducer elements 60 are affixed relative to each other and to the housing 50 may vary as necessary or as desired.

Figure 8B:
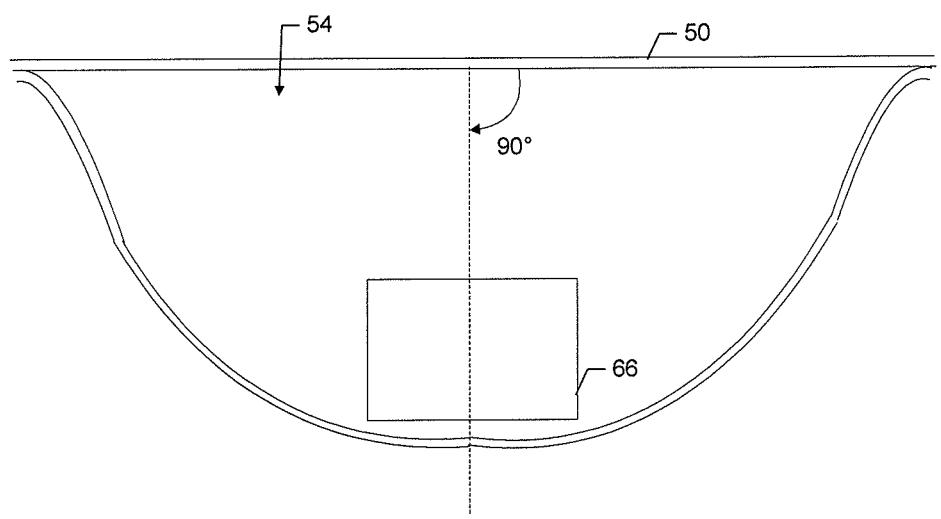
FIG. 8B is a diagram illustrating a cross section of components in a containment volume of a housing according to another exemplary embodiment of the present invention.

FIG. 8B is a diagram illustrating a cross section of components in the containment volume 54 according to an alternative exemplary embodiment. In this regard, FIG. 8B illustrates the arrangement of one linear transducer element 60 within the containment volume 54. The transducer element 60 according to this exemplary embodiment is a single linear transducer (e.g., downscan element 66) positioned to scan substantially below the vessel. As shown in FIG. 8B, the downscan element 66 may be positioned such that the widest dimension of the beamwidth of the downscan element 66 is centered at 90 degrees below the plane substantially parallel to the surface of the water. In other words, the downscan element 66 has the central portion of its fan shape aimed substantially straight down. As discussed above, the containment volume 54 may include electrical connections (not shown) to communicate with the transceiver 34 and supports, struts, rods or other supporting structures to secure the downscan element 66 in its respective orientation. The linear downscan element 66 may be held in place or otherwise affixed to the supporting structures via adhesive or any other suitable joining material such that transmissions produced by the downscan element 66 exit the housing 50 substantially at a 90 degree angle with respect to the plane of the face of the downscan element 66 from which the transmissions emanate.

Figure 9A:
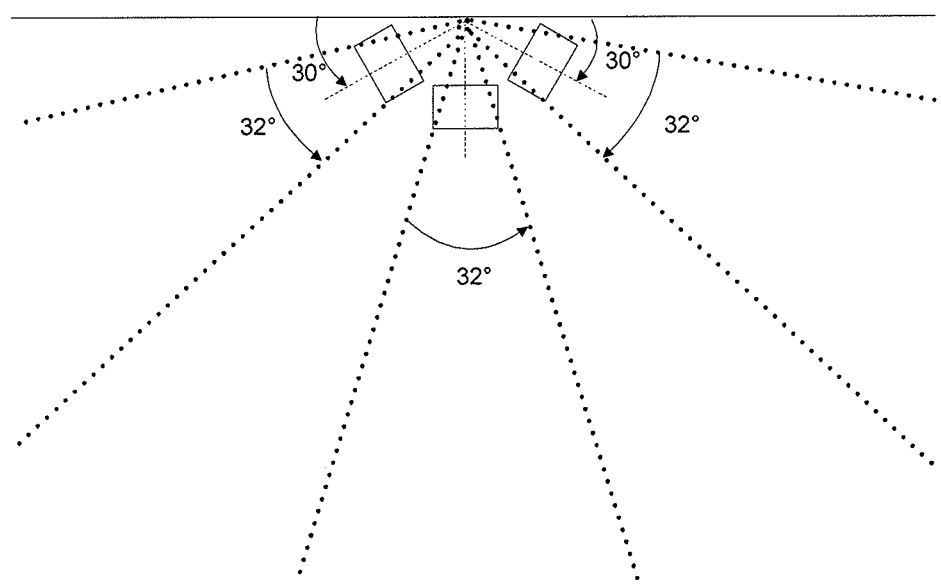
FIG. 9A shows an example of beam coverage for an 800 kHz operating frequency in one exemplary embodiment of the present invention.
Figure 9B:
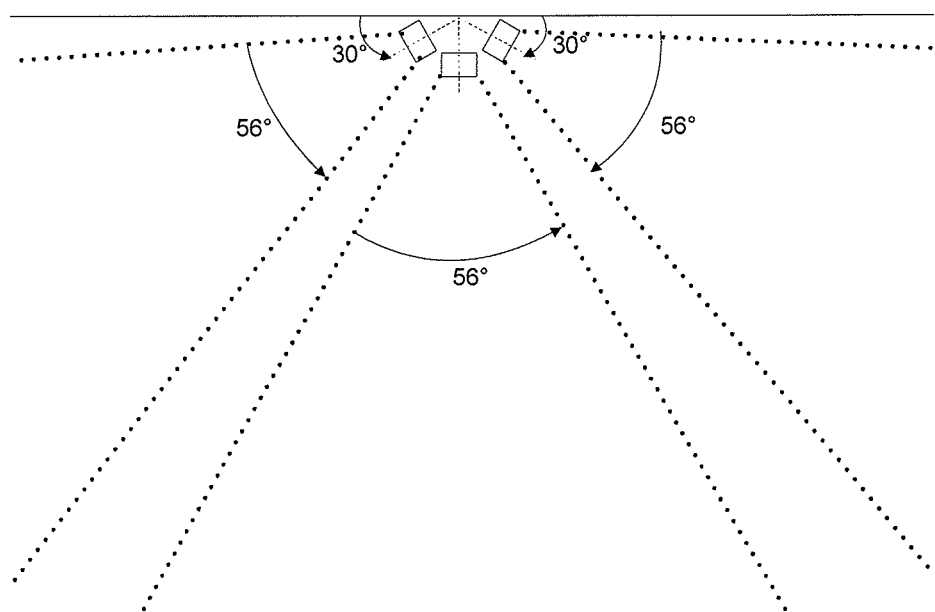
FIG. 9B shows an example of beam coverage for a 455 kHz operating frequency in one exemplary embodiment of the present invention.

FIG. 9A shows an example of beam coverage for an 800 kHz operating frequency in one exemplary embodiment. As such, the beamwidth (e.g., width between the half power points) of each of the three linear transducer elements 60 is about 32 degrees. FIG. 9B shows an example of beam coverage for a 455 kHz operating frequency in one exemplary embodiment, thereby providing about 56 degrees of beamwidth for each of the three linear transducer elements 60. Accordingly, in each of the exemplary embodiments of FIGS. 9A and 9B, the three fan-shaped segments together produce a discontinuous fan shaped beam. The discontinuity may be minimized in some instances by selection of transducer element dimensions and operating frequencies selected to minimize the size of the gaps (e.g., zones with sonar beam coverage outside of beam coverage area as defined by the half power points of the beams) between the beams of the transducer elements. Alternatively, the physical orientation of the transducer elements 60 with respect to each other could be changed in order to minimize the size of the gaps. However, it should be noted that in most cases some gap should be maintained in order to prevent interference between the beam patterns emanating from the linear transducer elements 60. Although the fan-shaped segments of an exemplary embodiment may all lie in the same plane, it may be desirable to alter the orientation of one or more of the transducer elements 60 such that a corresponding one or more of the fan-shaped segments is outside of the plane of the other fan-shaped segments. The gap could therefore be provided via planar separation of the fan-shaped segments rather than by providing separation between the segments within the same plane.

Figure 10A:
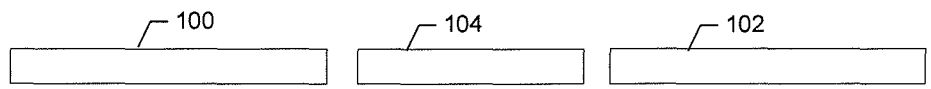
FIG. 10A illustrates a projection, onto a substantially flat sea bed, of the beam pattern of an exemplary transducer array providing gaps between fan shaped beams produced by a transducer array in which transducer elements are positioned to provide coplanar beams with gaps therebetween according to an exemplary embodiment of the present invention.
Figure 10B:
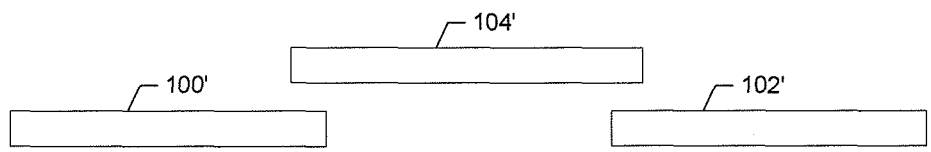
FIG. 10B illustrates a projection, onto a substantially flat sea bed, of the beam pattern of an exemplary transducer array providing gaps between the fan shaped beams produced by a transducer array in which the transducer elements are positioned to provide gaps with planar separation therebetween according to another exemplary embodiment of the present invention.

In this regard, FIG. 10A illustrates a projection, onto a substantially flat sea bed, of the beam pattern of an exemplary transducer array providing gaps between the boundaries of the projections as defined by the half power points defining fan shaped beams produced by a transducer array in which the transducer elements 60 are positioned to provide coplanar beams with gaps therebetween according to an exemplary embodiment. As such, a first transducer element beam projection 100, a second transducer element beam projection 102 and a third transducer element beam projection 104 are all shown lying in the same plane in FIG. 10A. Meanwhile, FIG. 10B illustrates a projection, onto a substantially flat sea bed, of the beam pattern of an exemplary transducer array providing gaps between the fan shaped beams produced by a transducer array in which the transducer elements 60 are positioned to provide gaps with planar separation therebetween according to another exemplary embodiment. Thus, the first transducer element beam projection 100', the second transducer element beam projection 102' and the third transducer element beam projection 104' are shown lying in different planes in FIG. 10B. Notably, in each of FIGS. 10A and 10B, the view is shown from the top looking down onto the sea bed and the beam projections are not necessarily to scale.

Figure 11A:
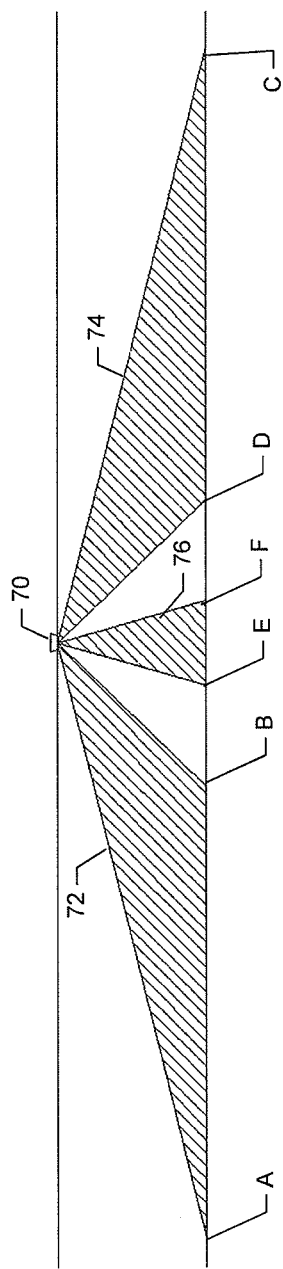
FIG. 11A shows an example of a view of the beam coverage associated with the exemplary embodiment of FIG. 9A in which the beam coverage is extended to the bottom of a flat bottomed body of water according to an exemplary embodiment of the present invention.
Figures 11B, 11C:
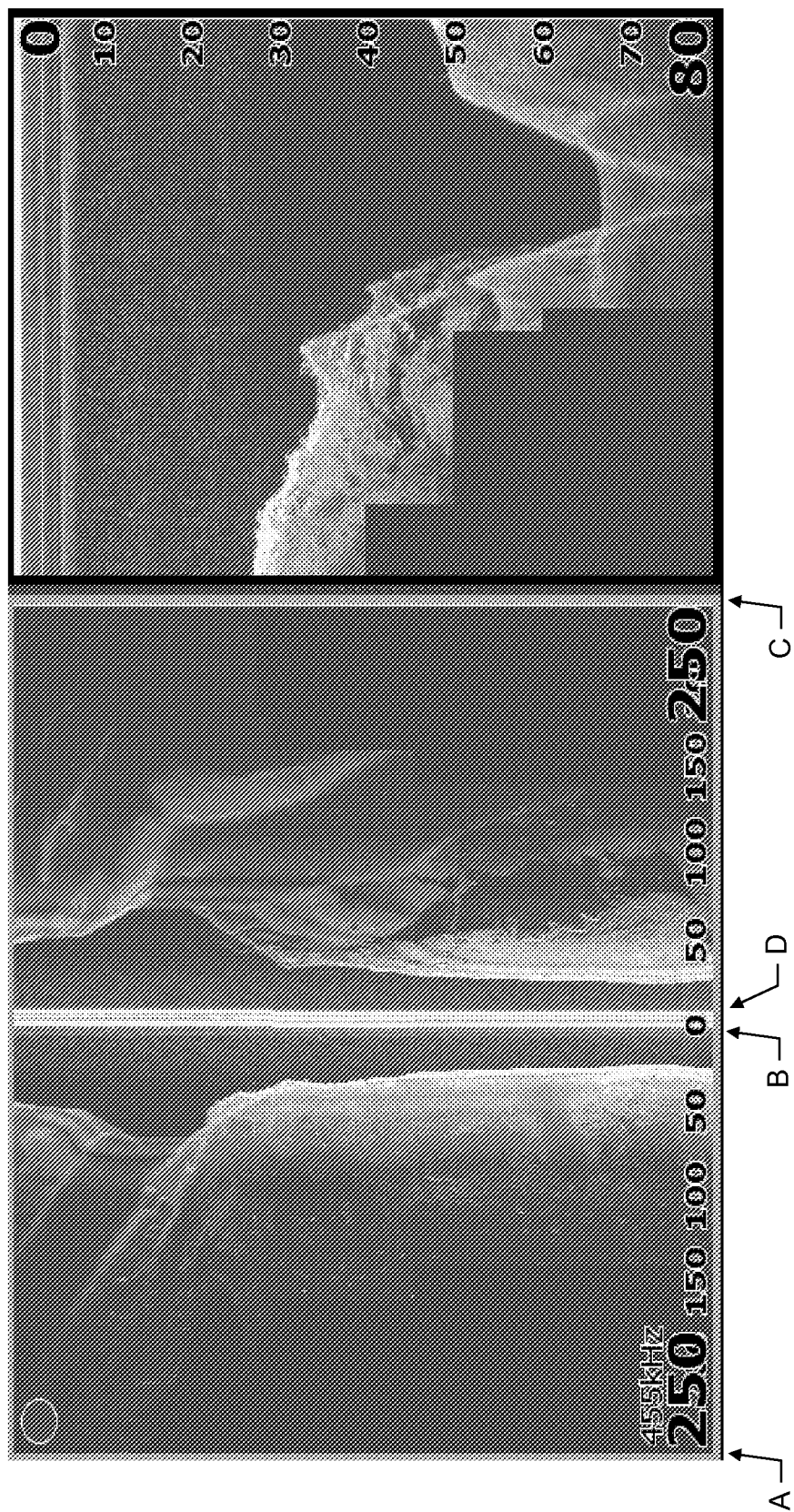
FIG. 11B illustrates example sidescan images that may be produced based on data from sidescan beams shown in FIG. 11A according to an exemplary embodiment of the present invention.
FIG. 11C illustrates example linear downscan images that may be produced based on data from linear downscan beams shown in FIG. 11A according to an exemplary embodiment of the present invention.

FIG. 11A shows an example of a view of the beam coverage associated with the embodiment of the example shown in FIG. 9A in which the beam coverage is extended to the bottom of a flat bottomed body of water. The illustration of FIG. 11A shows a view looking at the stern of a vessel 70 as the vessel 70 is driving away from the viewer (e.g., into the page). According to this example, a port sidescan beam 72 (e.g., that may be produced by port sidescan element 62) extends out to the port side of the vessel 70 providing coverage of the bottom from point A to point B. Meanwhile, a starboard sidescan beam 74 (e.g., that may be produced by starboard sidescan element 64) extends out to the starboard side of the vessel 70 from point C to point D. Additionally, a downscan beam 76 (e.g., that may be produced by downscan element 66) extends directly below the vessel 70 from point E to point F. As shown in FIG. 11A, the coverage areas defined between points A and B and points C and D are substantially larger than the coverage area defined between points E and F. Based on the increased bottom coverage, the display provided responsive to data received in the sidescan beams 72 and 74 will be different than the display provided responsive to data received in the downscan beam 76. FIGS. 11B and 11C show examples of images that may correspond to the beam coverage areas shown in FIG. 11A. In this regard, for example, FIG. 11B illustrates possible images that could correspond to the region defined between points A and B and points C and D (e.g., sidescan images), while FIG. 11C illustrates a possible image that may correlate to the coverage area between points E and F (e.g., a linear downscan image).

Figure 12A:
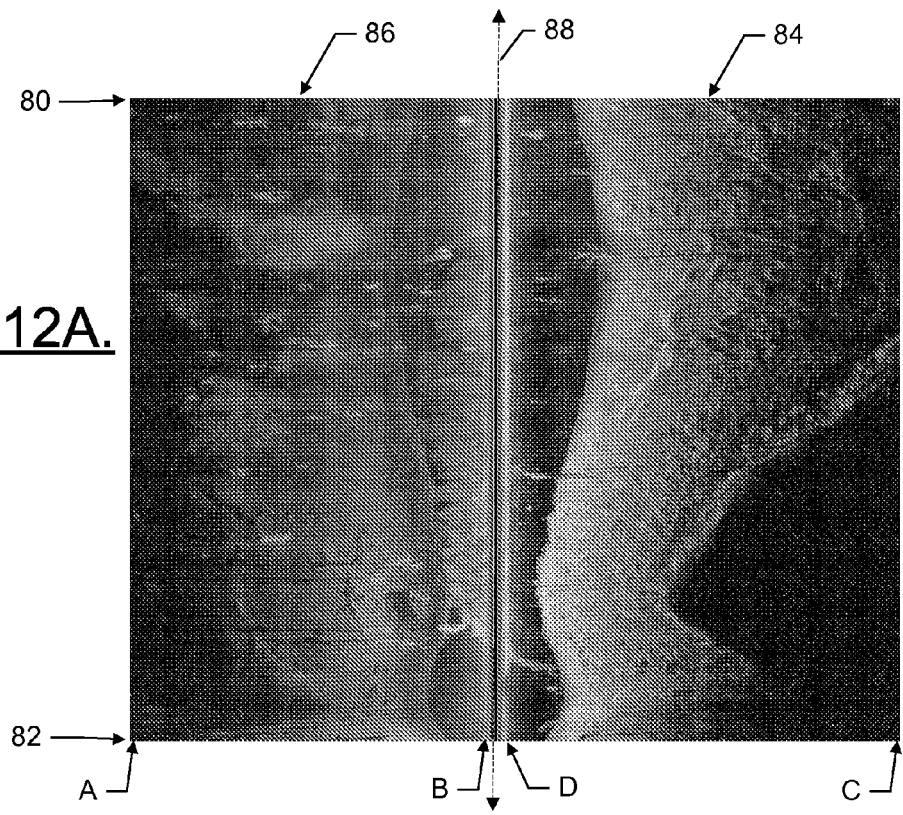
FIG. 12A illustrates example sidescan images that may be produced based on data from sidescan beams.

FIGS. 12A through 12F show examples of images that may be produced by embodiments of the present invention to illustrate differences between the display produced by a linear downscan element of an embodiment of the present invention and either a sidescan or a conventional circular downscan transducer element. In this regard, FIG. 12A illustrates an example image that may be produced based on data from the sidescan beams 72 and 74. For this example, assume the top of the display (identified by arrow 80) shows the most recent data (e.g., corresponding to the vessel's current position) and the bottom of the display (identified by arrow 82) shows the oldest data. Additionally, the right side of the display 84 may correspond to the starboard sidescan beam 74 while the left side of the display 86 corresponds to the port sidescan beam 72. Brighter pixels illustrated in FIG. 12A correspond to return data received in the corresponding sidescan beams. In this regard, data closest to dashed line 88 corresponds to the data gathered near point B (for the left side of the display 86) and near point D (for the right side of the display 84) and data at the left edge of the display corresponds to data gathered near point A while data at the right edge of the display corresponds to data gathered near point C over the time period from the position of arrow 82 to the position of arrow 80. Thus, well over 50% of the display of FIG. 12A (and in many cases 100%) is utilized to show data corresponding to bottom features, e.g. the topography of and structures attached to the bottom, that have provided return data from the sidescan beams 72 and 74. By comparison only a small portion (e.g., less than 20%) of the display shows any water column features, e.g., data from the water column between the vessel 70 and the portions of the bottom covered by each respective sidescan beam. The sidescan beams 72 and 74 also fail to provide depth data. Still further, the sidescan beams fail to provide depth data or bottom feature data or water column data for that portion of the bottom beneath the vessel, e.g., that portion between reference points B and D and the vessel 70 in FIG. 11.

Figure 12B:
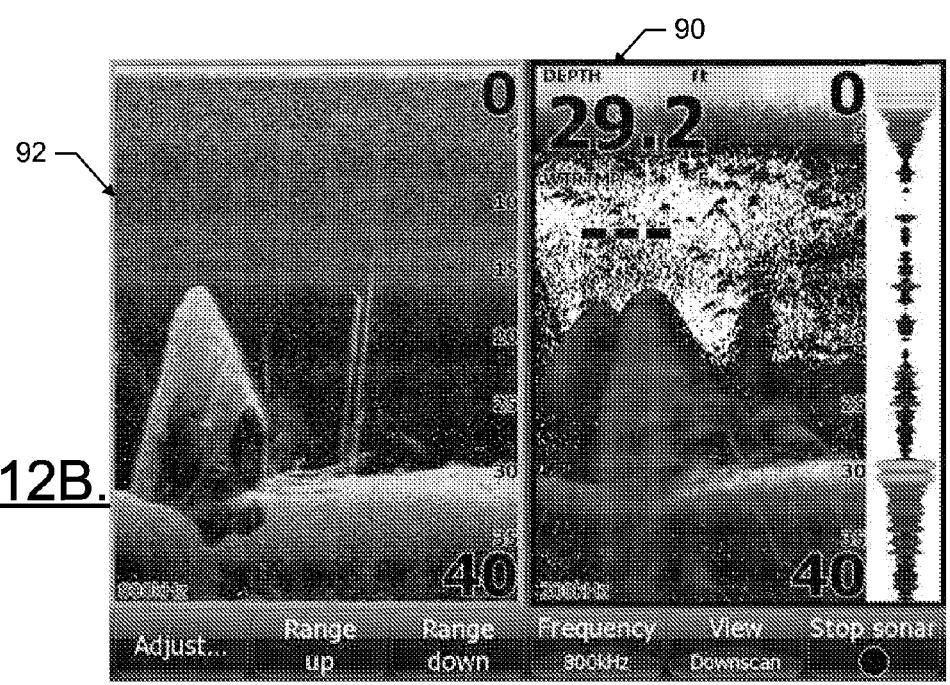
FIG. 12B illustrates a side-by-side comparison of images produced by a downscan linear transducer element according to an exemplary embodiment and a corresponding conical downscan image.
Figure 12C:
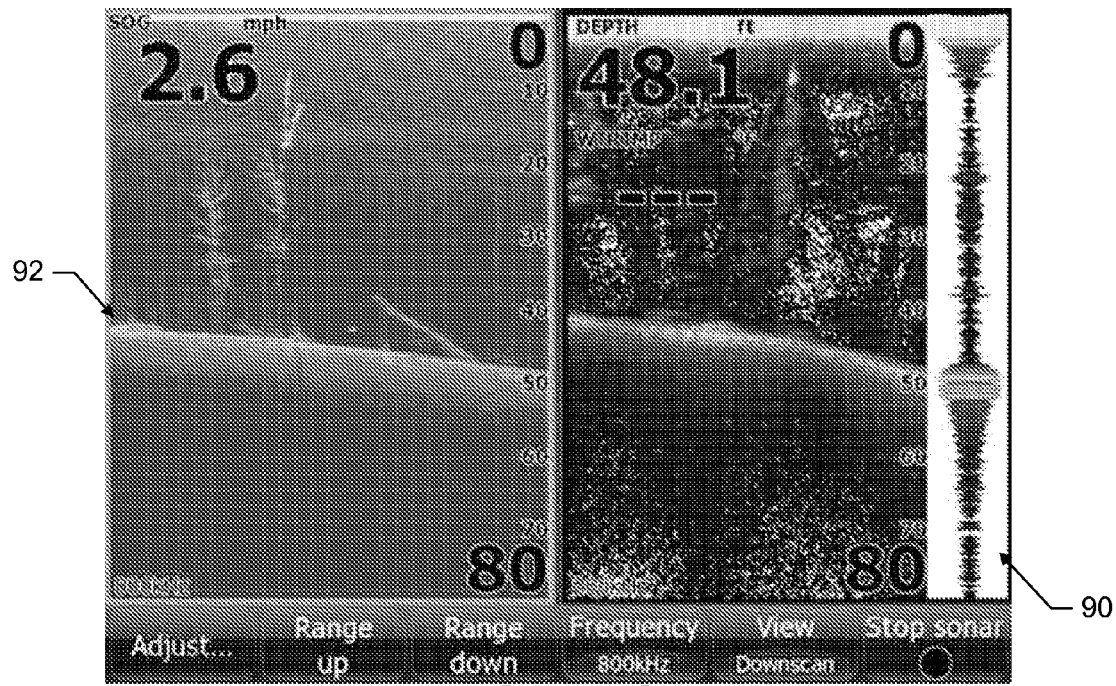
FIG. 12C illustrates another side-by-side comparison of images produced by a downscan linear transducer element according to an exemplary embodiment and a corresponding conical downscan image.
Figure 12D:
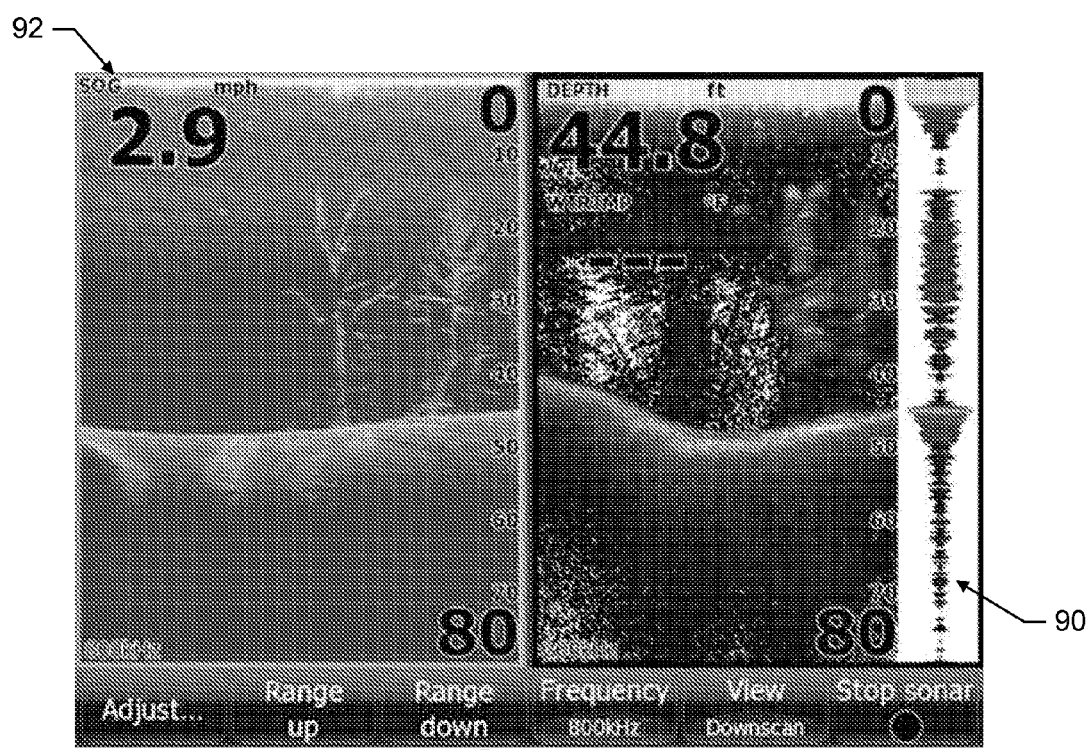
FIG. 12D illustrates still another side-by-side comparison of images produced by a downscan linear transducer element according to an exemplary embodiment and a corresponding conical downscan image.
Figure 12E:
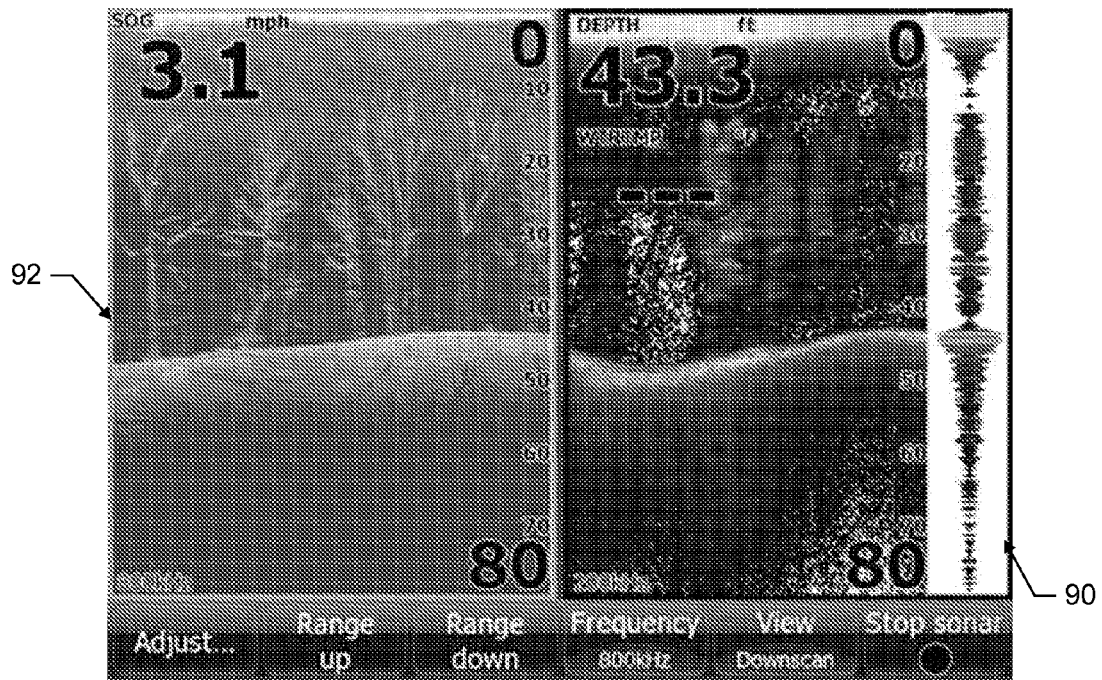
FIG. 12E illustrates yet another side-by-side comparison of images produced by a downscan linear transducer element according to an exemplary embodiment and a corresponding conical downscan image.
Figure 12F:
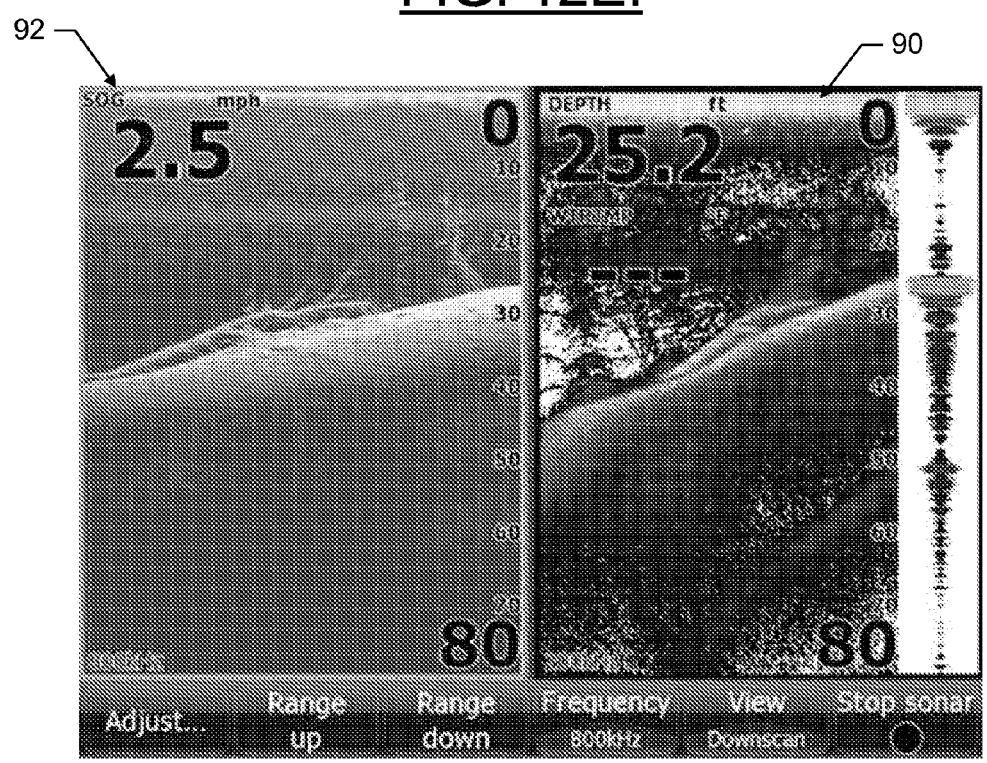
FIG. 12F illustrates yet still another side-by-side comparison of images produced by a downscan linear transducer element according to an exemplary embodiment and a corresponding conical downscan image.

FIGS. 12B through 12F show on the right side (e.g., right display 90) of each figure, exemplary screen shots of a conventional circular downscan transducer image that corresponds to the display (e.g., the left side of each figure (left display 92)) produced by the linear downscan element of an embodiment of the present invention (e.g., downscan element 66). In this regard, the left display of FIG. 12B shows a boulder on the left, two tree trunks rising up from the bottom near the center of the display, and, possibly, several fish (white spots) near the lower right. The corresponding same features can be vaguely determined from the right display 90 (i.e., the circular downscan display), but the images are much less clear. Similarly, FIGS. 12C, 12D and 12E clearly show very detailed images of trees rising vertically from the bottom in the left display 92, while such features are very difficult to distinguish on the right display 90. FIG. 12F clearly shows a downed tree and at least two vertical trees nearby in the left display 92, whereas the same features are difficult to discern in the right display 90.

The exemplary linear downscan image on the left side of FIG. 12B includes a numerical depth scale 0-40 on the right side, with sonar reflection data being represented on the display screen at the time-dependent depth using known sonar imaging practices. Boat position is represented by the numeral 0, or some other desirable icon, for the most recent sonar pings, and the oldest sonar pings are presented by the left side of the screen, presenting a scrolling image as the boat (and transducer) move across the water surface over time. The far right column reflects the intensity of the return echo received at the circular downscan transducer, plotted adjacent the 0-40 depth scale.

Accordingly, by placing a linear transducer in a downward oriented position, a much improved image quality is achieved for bottom data and structures attached to it or rising above it relative to the conventional circular downscan sonar. In this regard, while sidescan images are valued for their ability to provide detailed images of laterally distant bottom features, they are unable to provide depth data or bottom data or water column data below the vessel. A linear downscan element provides the unexpected advantage of providing detailed images of the water column below the vessel (e.g., upwardly extending submerged trees, fish, etc.), as well as details of the features of the bottom or structures resting on or rising above the bottom (e.g., rocks, crevices, submerged trees, sunken objects, etc.), and a depth indication that can be registered (e.g., feet or meters). For example, again referring to the left image of FIG. 12B, the mass of bright pixels at about 30 feet (as indicated by the numbers in increments of five feet that extend down the right edge of the left display 92) represent bottom feature data and are indicative of the depth at which the bottom is encountered. The bottom feature data may also, in some cases, indicate the type of bottom (e.g., rocky, muddy, hard, soft, flat, sloped, smooth, rough, etc.). Thus, sonar returns associated with the bottom in a linear downscan display are not only indicative of bottom features, but are also indicative of depth and water column data. However, the bottom feature data represents a relatively small percentage of the overall display area. Due to the relatively small percentage of display area that is devoted to bottom feature data, a relatively large percentage of the display area may be devoted to other data, e.g., data representing the water column above the bottom). Thus, for example, as shown in FIG. 12B, water column features are represented by data including a boulder and trees extending from the bottom along with any suspended objects (e.g., schools of bait fish, individual large fish, etc.), thermoclines, and other features may be displayed in greater detail along with the indication of bottom depth. Meanwhile, even in situations where the zoom level of the display is not set such that the lake or sea bottom is near the lowest portion of the display (such as in FIG. 12C), the bottom features only account for a small percentage of the display area, while the water column features account for more than 50% and the area below the lake or sea bottom is essentially featureless.

FIGS. 12B through 12F each show far less than 50% (and typically less than 20%) of the display being utilized to show data corresponding to bottom features, and do so for the water column beneath the vessel. As shown, a linear transducer positioned as a downscan element (e.g., downscan element 66) according to an exemplary embodiment, is capable of providing far more information regarding the water column itself rather than merely the bottom features or depth. Thus, water column data can be received and displayed representing schools of fish, individual fish and certain structural features in the water column directly below the vessel 70. Additionally, as shown in FIGS. 12B through 12F, a linear transducer positioned as a downscan element is also capable of producing depth data. In this regard, whereas a sidescan image produces relatively high quality images of bottom features (see for example, FIG. 12A), it is unable to produce useful depth data or water column data. A downscan image produced by a linear transducer according to an exemplary embodiment of the present invention produces depth data along with bottom feature data and water column data.

Figure 13A:
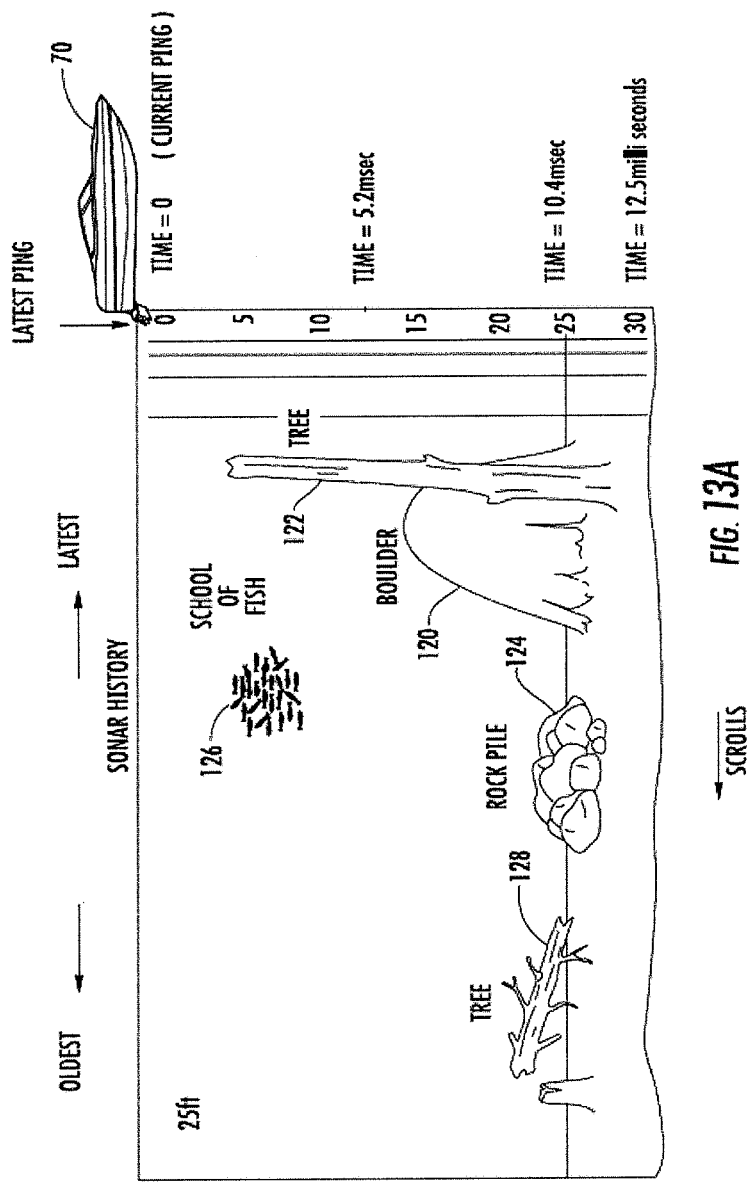
FIG. 13A is a diagram illustrating an example of a sea bottom structure viewed through a linear downscan transducer element according to an exemplary embodiment.
Figure 13B:
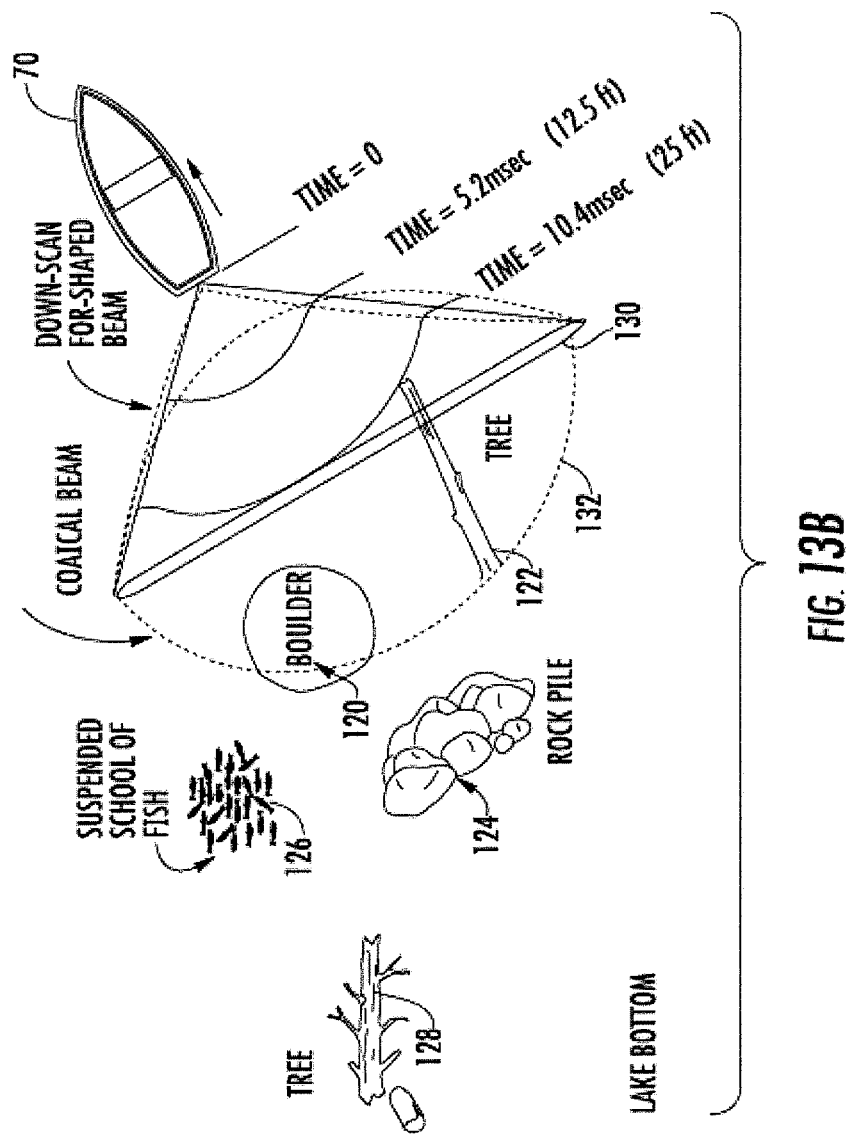
FIG. 13B is a diagram illustrating an example of a fan shaped beam from a linear downscan transducer compared to a conical beam from a cylindrical transducer for the sea bottom structure illustrated in FIG. 13A according to an exemplary embodiment.

FIG. 13A provides an example of a display of the bottom structure as viewed through use of a linear downscan sonar element (e.g., downscan element 66) of an exemplary embodiment of the present invention. FIG. 13B shows the vessel 70 and various bottom features viewed from above. The bottom features include a boulder 120, a vertical tree 122, a rock pile 124, a school of fish 126 and a fallen, horizontal tree 128. FIG. 13B also shows a linear transducer downscan fan-shaped sonar beam 130 projected onto the bottom as compared to a circular transducer downscan conical beam 132 projected onto the bottom. As can be appreciated from the corresponding example display provided in FIG. 13A, since the linear downscan beam 130 has a narrow aspect in one direction and a broad aspect in the other, the amount of data received and therefore processed for display is less with respect to each feature for which a return is received than for the conical beam 132. There is typically no overlap in coverage from each outgoing sound wave to the next (ping to ping) in the linear downscan beam 130 whereas there will be such overlap in the conical beam 132. Thus, while data corresponding to the conical beam 132 is processed, it produces blurred images due to the additional return data received. The linear downscan beam 130 is able to produce "cleaner" images that more accurately illustrate feature data that reflects what objects are in the water column and on the bottom beneath the vessel. Note, however, that there can be at least partial overlap in the bottom topography that is sonified by the linear and circular transducer, as shown in FIG. 13B.

By providing the downscan element 66 as a linear transducer element of the same type and construction as one or both of the port side linear element 62 and the starboard side linear element 64, embodiments of the present invention provide vivid images of the column of water over which the vessel passes in addition to providing vivid images of the water column on both sides of the vessel, which is provided by conventional sidescan sonar systems that either neglect the column of water beneath the vessel or only scan such region with a conical beam from a transducer element having a cylindrical shape that is not capable of providing the level of detail provided by embodiments of the present invention. Moreover, embodiments of the present invention provide high quality images of the column of water over which the vessel passes without the high degree of complexity and cost associated with a multibeam system.

Figure 14:
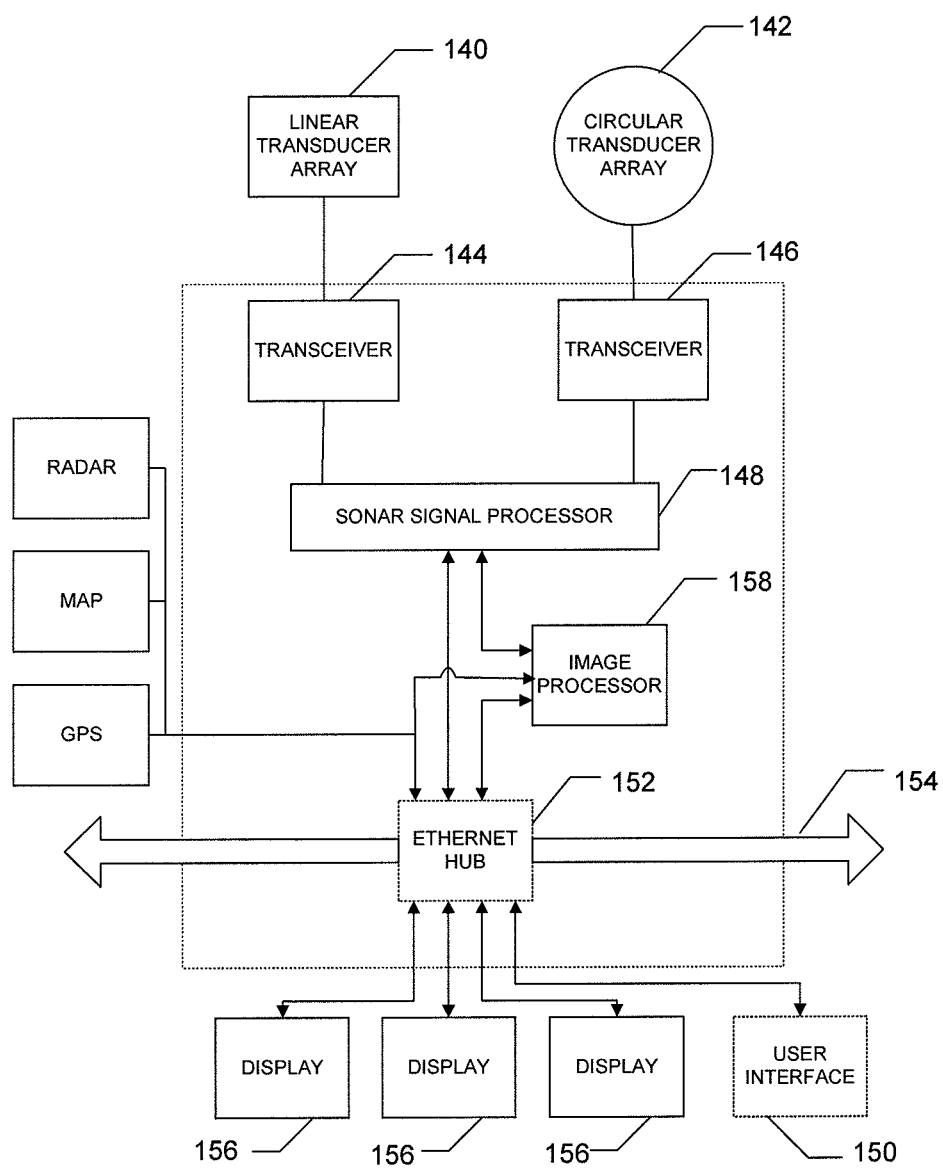
FIG. 14 is a basic block diagram illustrating a sonar system according to an exemplary embodiment of the present invention.

FIG. 14 illustrates an exemplary sonar system incorporating linear and circular downscan transducers 140, 142. The two transducers may be in the same or separate housings. They typically utilize different operational frequencies. Such may also assist in minimizing interference. Similar to the system illustrated in FIG. 5, the transducers are operationally connected to the transceivers 144, 146, which configure the transducer outputs for receipt by the sonar signal processor 148. The sonar signal processor executes various programs stored or as may be selected by the user interface 150. The Ethernet hub 152, network 154, displays 156 and user interface 150 operate as described for the corresponding components of FIG. 5. The image processor 158 may perform a variety of functions to optimize or customize the display images, including such features as split screen to show multiple different sonar images or data. Examples include individual and separate images of GPS, waypoints, mapping, nautical charts, GPS tracking, radar, etc., which are typically shown side-by-side or stacked. Additional examples include individual data boxes, such as speed, depth, water, temperature, range or distance scales, location or waypoint, latitude, longitude, time, etc. Still further examples include composite images that combine information from one or more of these sources, such as the images from the linear downstream and circular downstream transducers to overlay the images. For example, the traditional "fish arch" image representing a possible fish using a circular downscan sonar may be imposed over a small white circle or oval representing a possible fish using a linear downscan sonar. Still further, one image may be colorized to distinguish it visibly from data representing another image. As such, for example, the images may be combined using image blending or overlay techniques. Alternatively, individual images may be presented, or different images, simultaneously on different displays without overlay. Image data packets or streams may also have additional data associated therewith, such as time of day, location, temperature, speed, GPS, etc.

Notably, the example of FIG. 14 may be simplified in some embodiments. In this regard, the radar, map and GPS modules of FIG. 14 along with the Ethernet hub 152 may not be included in some embodiments. Moreover, in one example, an embodiment of the present invention may include essentially only processing circuitry to handle inputs from a linear and circular transducer array along with a display in a single device. As such, for example, all of the electronics for handling linear and circular transducer inputs may be included along with a display within a single box, without any Ethernet connection or other peripherals.

Figure 15A:
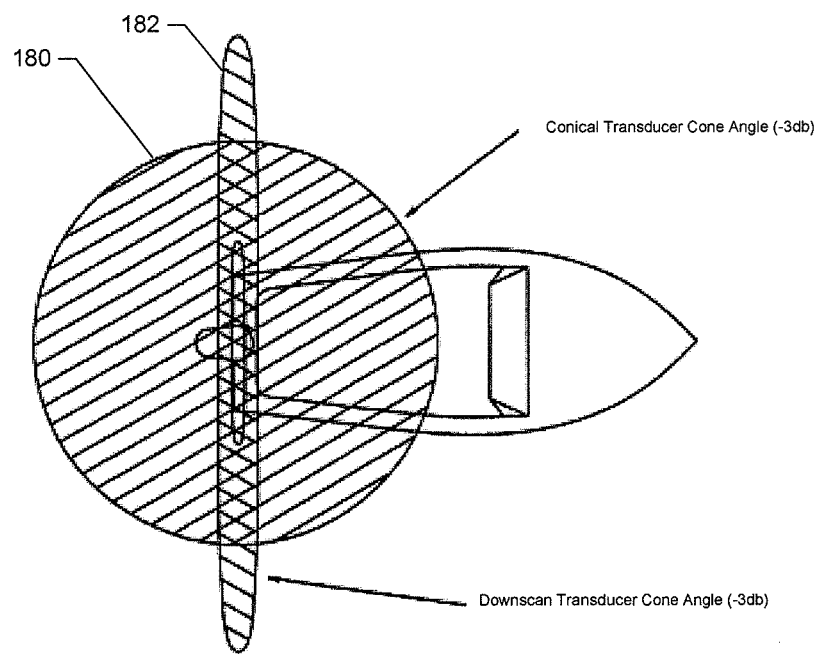
FIG. 15A illustrates an example of a top view of the beam overlap that may occur in situations where a linear downscan transducer and a circular downscan transducer are employed according to an exemplary embodiment of the present invention.
Figure 15B:
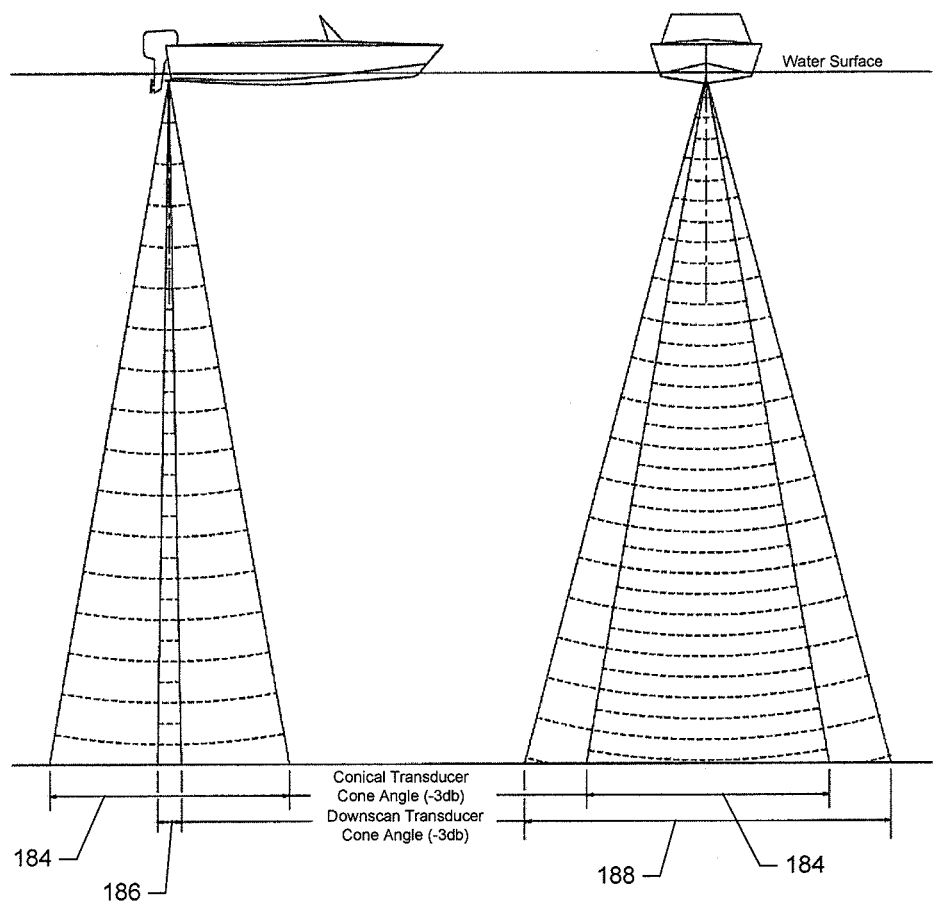
FIG. 15B shows side views of the same beam overlap shown in FIG. 15A from the starboard side of a vessel and from ahead of the bow of the vessel according to an exemplary embodiment of the present invention.

FIG. 15A illustrates an example of a top view of the beam overlap that may occur in situations where a linear downscan transducer and a circular downscan transducer are employed simultaneously. FIG. 15B shows side views of the same beam overlap shown in FIG. 15A from the starboard side of a vessel (on the left side of the page) and from ahead of the bow of the vessel (on the right side of the page). As shown in FIG. 15A, there is overlap between a conical beam projection 180 showing an example coverage area of a beam produced by the circular downscan transducer and a downscan beam projection 182 showing an example coverage area of a beam produced by the linear downscan transducer. The differences between the beam patterns of the linear and circular downscan transducers are further illustrated in FIG. 15B in which it can be seen that the beamwidth 184 of the beam produced by the circular downscan transducer is substantially the same regardless of the side from which the beam is viewed. However, the beamwidth 186 of the beam produced by the linear downscan transducer as viewed from the starboard side of the vessel is substantially smaller than the beamwidth 188 of the beam produced by the linear downscan transducer as viewed from ahead of the bow of the vessel. Moreover, the beamwidth 188 is wider than the beamwidth 184, while the beamwidth 186 is narrower than the beamwidth 184.

Figure 16A:
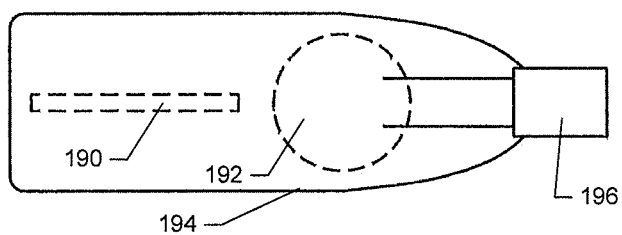
FIG. 16A is a diagram showing a perspective view of a linear downscan transducer and a circular downscan transducer within a single housing from a point above the housing according to an exemplary embodiment of the present invention.
Figure 16B:
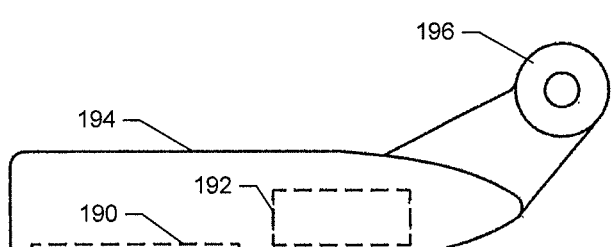
FIG. 16B is a perspective view from one side of the housing of FIG. 16A at a point substantially perpendicular to a longitudinal axis of the housing according to an exemplary embodiment of the present invention.
Figure 16C:
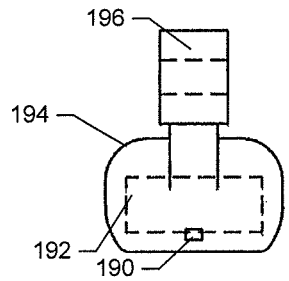
FIG. 16C is a perspective view from the front side of the housing of FIG. 16A at a point looking straight down the longitudinal axis of the housing according to an exemplary embodiment of the present invention.

FIGS. 16A through 16C illustrate diagrams of a linear downscan transducer 190 and a circular downscan transducer 192 within a single streamlined housing 194 from various different perspectives. In this regard, FIG. 16A is a perspective view from above the housing 194. Meanwhile, FIG. 16B is a perspective view from one side of the housing 194 at a point substantially perpendicular to a longitudinal axis of the housing 194 and FIG. 16C is a perspective view from the front side of the housing 194 at a point looking straight down the longitudinal axis of the housing 194. As shown in FIGS. 16A-16C, the linear downscan transducer 190 and the circular downscan transducer 192 may each be disposed to be in planes that are substantially parallel with each other and with a plane in which the longitudinal axis of the housing 194 lies. Generally speaking, the linear downscan transducer 190 and the circular downscan transducer 192 may also be disposed in line with the longitudinal axis of the housing 194. Although shown in a particular order in FIGS. 16A-16C, the ordering of the placement of the linear downscan transducer 190 and the circular downscan transducer 192 within the housing 194 may be reversed in some examples. Furthermore, in some cases, the linear downscan transducer 190 and the circular downscan transducer 192 may each be located in their own respective separate housings rather than both being within a single housing. FIGS. 16A-16C also illustrate an example of a mounting device 196 for mounting the housing 194 to a vessel.

By way of comparison, FIGS. 17A through 17C illustrate diagrams of a single linear downscan transducer 190 a housing 198 from various different perspectives. In this regard, FIG. 17A is a perspective view from above the housing 198. Meanwhile, FIG. 17B is a perspective view from one side of the housing 198 at a point substantially perpendicular to a longitudinal axis of the housing 198 and FIG. 17C is a perspective view from the front side of the housing 198 at a point looking straight down the longitudinal axis of the housing 198. As shown in FIGS. 17A-17C, by employing only the linear downscan transducer 190 the size of the housing 198 may be reduced. In this regard, for example, particularly FIG. 17C shows a reduction in the cross sectional size of the housing 198 as compared to the cross sectional size of the housing 194 of FIG. 16C. Thus, for example, the housing 198 may introduce less drag than the housing 194.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sonar transducer assembly for mounting to a surface watercraft, the assembly comprising:
    a rectangular first transducer configured to produce a first beam defining a fan-shape and extending generally in a first plane; and
    a rectangular second transducer configured to produce a second beam defining a fan- shape and extending generally in a second plane, wherein the first transducer and second transducer are approximately mounted in a single lateral plane with respect to a running direction of the surface watercraft;
    wherein the first transducer and the second transducer are oriented such that the respective first and second beams extend from the single lateral plane to insonify different first and second areas each extending laterally with respect to the running direction of the surface watercraft, wherein the first transducer and the second transducer are oriented to provide a gap between the first area insonified by the first beam and the second area insonified by the second beam, with the gap extending in the running direction of the surface watercraft, and such that the first beam is outside of the second plane of the second beam, the resulting planar separation of the first and second planes of the first and second beams reducing interference between the first and second transducers.

2. The assembly according to claim 1, wherein the first transducer and the second transducer are oriented such that the respective first and second beams insonify different first and second areas when produced simultaneously.

3. The assembly according to claim 1, wherein the first transducer comprises a downscan transducer and the second transducer comprises a sidescan transducer.

4. The assembly according to claim 1, wherein the first transducer comprises a sidescan transducer and the second transducer comprises a further sidescan transducer.

5. The assembly according to claim 1 further comprising a rectangular third transducer configured to produce a third beam defining a fan-shape and extending generally in a third plane, wherein the third transducer is oriented to insonify a third area that extends laterally with respect to the running direction of the surface watercraft.

6. The assembly according to claim 5, wherein the first transducer comprises a downscan transducer, wherein the second transducer comprises a sidescan transducer, and wherein the third transducer comprises a further sidescan transducer.

7. The assembly according to claim 5, wherein the first plane and the third plane each extend laterally from the running direction of the surface watercraft such that the first and third planes are coplanar, and such that the first and third beams are outside of the second plane of the second beam reducing interference between the second transducer and the first and third transducers.

8. A sonar transducer assembly for mounting to a surface watercraft, the sonar transducer assembly comprising a transducer housing within which are mounted at least a rectangular first transducer and a rectangular second transducer, wherein the first transducer is configured to produce a first beam defining a fan-shape and extending generally in a first plane, wherein the second transducer is configured to produce a second beam defining a fan-shape and extending generally in a second plane, wherein the first transducer and second transducer are approximately mounted in a single lateral plane with respect to a running direction of the surface watercraft, wherein the first transducer and the second transducer are oriented inside the housing such that the respective first and second beams extend from the single lateral plane to insonify different first and second areas each extending laterally with respect to the running direction of the surface watercraft, wherein the first transducer and the second transducer are oriented to provide a gap between the first area insonified by the first beam and the second area insonified by the second beam, with the gap extending in the running direction of the surface watercraft, and such that the first beam is outside of the second plane of the second beam, the resulting planar separation of the first and second planes of the first and second beams reducing interference between the first and second transducers.

9. The assembly according to claim 8, wherein the first transducer and the second transducer are oriented such that the respective first and second beams insonify different first and second areas when produced simultaneously.

10. The transducer assembly according to claim 8, wherein the first transducer comprises a downscan transducer and the second transducer comprises a sidescan transducer.

11. The transducer assembly according to claim 8, wherein the first transducer comprises a sidescan transducer and the second transducer comprises a further sidescan transducer.

12. The transducer assembly according to claim 8 further comprising a rectangular third transducer mounted within the transducer housing and configured to produce a third beam defining a fan-shape and extending generally in a third plane, wherein the third transducer is oriented inside the housing to insonify a third area that extends laterally with respect to the running direction of the surface watercraft.

13. The transducer assembly according to claim 12, wherein the first transducer comprises a downscan transducer, wherein the second transducer comprises a sidescan transducer, and wherein the third transducer comprises a further sidescan transducer.

14. The transducer assembly according claim 12, wherein the first plane and the third plane each extend laterally from the running direction of the surface watercraft such that the first and third planes are coplanar, and such that the first and third beams are outside of the second plane of the second beam reducing interference between the second transducer and the first and third transducers.

15. A method for assembling a sonar transducer system for mounting to a surface watercraft, the method comprising:
providing a transducer housing;
mounting a rectangular first transducer configured to produce a first beam defining a fan- shape and extending generally in a first plane; and
mounting a rectangular second transducer configured to produce a second beam defining a fan-shape and extending generally in a second plane, wherein the first transducer and second transducer are approximately mounted in a single lateral plane with respect to a running direction of the surface watercraft, wherein the first transducer and the second transducer are oriented inside the transducer housing such that the respective first and second beams extend from the single lateral plane to insonify different first and second areas each extending laterally with respect to the running direction of the surface watercraft, wherein the first transducer and the second transducer are oriented to provide a gap between the first area insonified by the first beam and the second area insonified by the second beam, with the gap extending in the running direction of the surface watercraft, and such that the first beam is outside of the second plane of the second beam, the resulting planar separation of the first and second planes of the first and second beams reducing interference between the first and second transducers.

16. The method according to claim 15, wherein mounting the first transducer and the second transducer comprises mounting the first transducer and second transducer in an orientation such that the respective first and second beams insonify different first and second areas when produced simultaneously.

17. The method according to claim 15, wherein the first transducer comprises a downscan transducer and the second transducer comprises a sidescan transducer.

18. The method according to claim 15, wherein the first transducer comprises a sidescan transducer and the second transducer comprises a further sidescan transducer.

19. The method according to claim 15 further comprising mounting a rectangular third transducer configured to produce a third beam defining a fan-shape and extending generally in a third plane, wherein the third transducer is oriented to insonify a third area that extends laterally with respect to the running direction of the surface watercraft.

20. The method according to claim 19, wherein the first transducer comprises a downscan transducer, wherein the second transducer comprises a sidescan transducer, and wherein the third transducer comprises a further sidescan transducer.

21. The method according to claim 19, wherein the first plane and the third plane each extend laterally from the running direction of the surface watercraft such that the first and third planes are coplanar, and such that the first and third beams are outside of the second plane of the second beam reducing interference between the second transducer and the first and third transducers.

* * * * *